United States Patent
Shinomoto et al.

(10) Patent No.: US 10,303,136 B2
(45) Date of Patent: May 28, 2019

(54) CONTROL METHOD, RECORDING MEDIUM, AND INFORMATION PROVIDING METHOD FOR TERMINAL DEVICE AND INFORMATION PROVIDING SYSTEM

(71) Applicant: Panasonic Intellectual Property Corporation of America, Torrance, CA (US)

(72) Inventors: Yuki Shinomoto, Tokyo (JP); Hiroyuki Kubotani, Hyogo (JP); Yasuhiro Yuki, Kanagawa (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 398 days.

(21) Appl. No.: 15/010,579

(22) Filed: Jan. 29, 2016

(65) Prior Publication Data

US 2016/0147208 A1  May 26, 2016

Related U.S. Application Data

(63) Continuation of application No. PCT/JP2014/003983, filed on Jul. 30, 2014.

(30) Foreign Application Priority Data

Aug. 28, 2013 (JP) .................................. 2013-176791

(51) Int. Cl.
*G05B 15/02* (2006.01)
*G06F 13/00* (2006.01)
(Continued)

(52) U.S. Cl.
CPC .............. *G05B 15/02* (2013.01); *F24C 7/085* (2013.01); *G06F 3/04817* (2013.01);
(Continued)

(58) Field of Classification Search
None
See application file for complete search history.

(56) References Cited

U.S. PATENT DOCUMENTS 6,137,095 A * 10/2000 Kashimoto .......... H05B 1/0266
                                                   219/678
9,752,784 B2 * 9/2017 Phillips ................... F24C 7/087
(Continued)

FOREIGN PATENT DOCUMENTS

JP    61-076825    4/1986
JP    2006-153432    6/2006

OTHER PUBLICATIONS

International Search Report of PCT application No. PCT/JP2014/003983 dated Oct. 28, 2014.

*Primary Examiner* — Michael Lebentritt
(74) *Attorney, Agent, or Firm* — Wenderoth, Lind & Ponack, L.L.P.

(57) ABSTRACT

A control method for controlling a terminal device includes using a memory that manages cooking appliance logs each including at least a cooking time of a food and first information indicating an age-related deterioration level of one of the cooking appliances to acquire, from among candidates of a recommended cooking time calculated based on the first information and the cooking time and stored in a server apparatus, third information indicating a recommended cooking time corresponding to second information indicating an age-related deterioration level of the first cooking appliance, displaying, on a display, a user interface that allows a user to select one of the candidates including at least the recommended cooking time for the first cooking appliance using the third information, and outputting a setting command for setting the selected cooking time to the first cooking appliance upon detecting selection of one of the cooking times through the user interface.

12 Claims, 15 Drawing Sheets

(51) Int. Cl.
*G09G 5/00* (2006.01)
*H05B 6/64* (2006.01)
*H05B 6/66* (2006.01)
*F24C 7/08* (2006.01)
*G06F 3/0481* (2013.01)

(52) U.S. Cl.
CPC ............... *G06F 13/00* (2013.01); *G09G 5/00* (2013.01); *H05B 6/6435* (2013.01); *H05B 6/668* (2013.01)

(56) References Cited

U.S. PATENT DOCUMENTS

| | | | | |
|---|---|---|---|---|
| 2005/0109333 A1* | 5/2005 | Thomas | ................. | F24C 7/082 126/42 |
| 2010/0140248 A1* | 6/2010 | Yi | ........................... | F24C 7/087 219/391 |
| 2010/0192784 A1* | 8/2010 | Shim | ...................... | F24C 7/082 99/325 |
| 2013/0067375 A1* | 3/2013 | Kim | ........................ | F25D 29/00 715/769 |
| 2015/0000316 A1* | 1/2015 | Sato | ........................ | F25D 23/00 62/127 |
| 2015/0074237 A1* | 3/2015 | Unagami | ............... | G06Q 99/00 709/219 |
| 2015/0374162 A1* | 12/2015 | Nonaka | ................... | A47J 27/62 426/233 |
| 2016/0010872 A1* | 1/2016 | Aso | ..................... | H05B 6/6441 700/90 |
| 2016/0018112 A1* | 1/2016 | Phillips | ................. | H05B 6/062 99/331 |
| 2017/0161290 A1* | 6/2017 | Kuroyama | .......... | G06F 17/3097 |
| 2017/0310810 A1* | 10/2017 | Kuemmerle | ........ | H04M 1/7253 |

\* cited by examiner

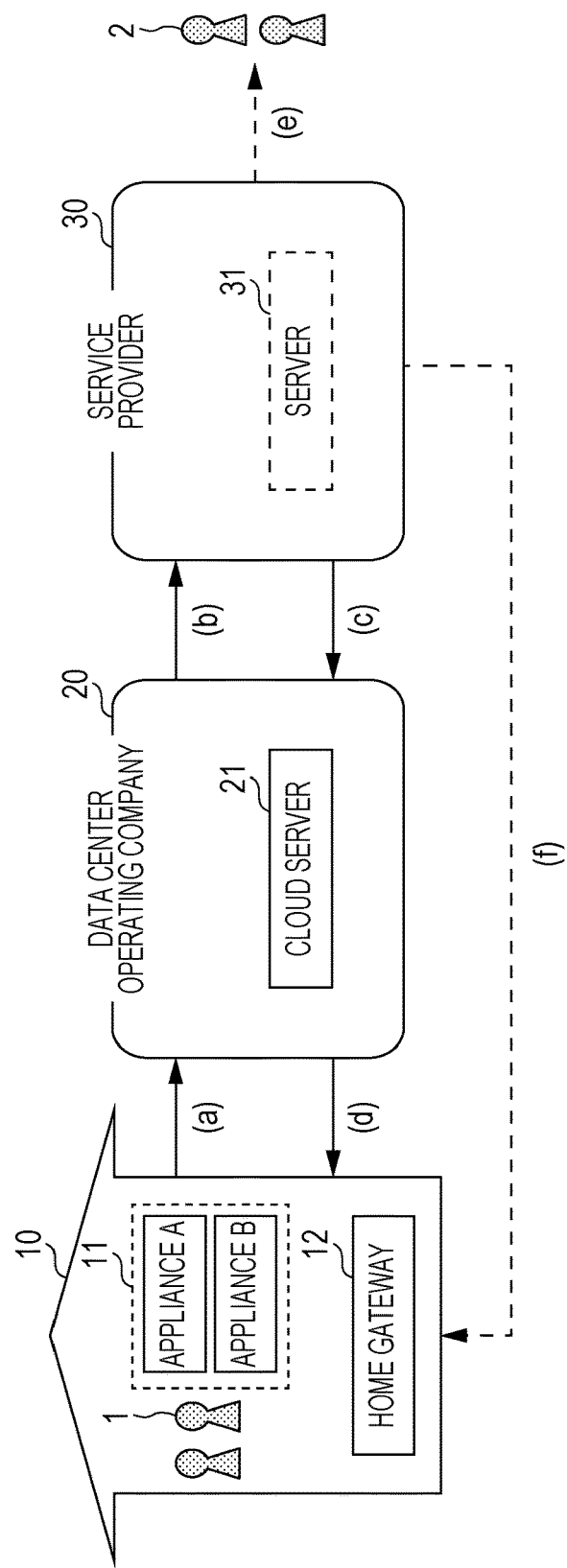

FIG. 3A

| BAR CODE NUMBER | PRODUCT NAME | MAKER | QUANTITY | POWER LEVEL | HEATING TIME |
|---|---|---|---|---|---|
| 49XXXXXXXXXXX | FRIED CHICKEN | YY FROZEN FOOD | 1 | 600 W | 30 SEC. |
| 49XXXXXXXXXXX | FRIED CHICKEN | YY FROZEN FOOD | 2 | 600 W | 60 SEC. |
| 49XXXXXXXXXXX | FRIED CHICKEN | YY FROZEN FOOD | 1 | 500 W | 40 SEC. |

FIG. 3B

| APPLIANCE ID | TIME | MENU | POWER LEVEL | USAGE TIME | TOTAL USAGE TIME, TOTAL USAGE COUNT FOR EACH OF MENUS | | |
|---|---|---|---|---|---|---|---|
| | | | | | MICROWAVE | | (OVEN, GRILL, TOAST, STEAM ...) |
| | | | | | TOTAL USAGE TIME | TOTAL USAGE COUNT | |
| XX-001 | 07/01/2013 18:05:31 | MICROWAVE | 600 W | 30 SEC. | 40 HOURS 15 MINUTES 32 SECONDS | 4998 | ... |
| XX-001 | 07/01/2013 18:10:03 | OVEN | 180°C | 30 SEC. | 40 HOURS 15 MINUTES 32 SECONDS | 4998 | ... |
| XX-001 | 07/02/2013 12:10:42 | MICROWAVE | 500 W | 35 SEC. | 40 HOURS 16 MINUTES 7 SECONDS | 4999 | ... |

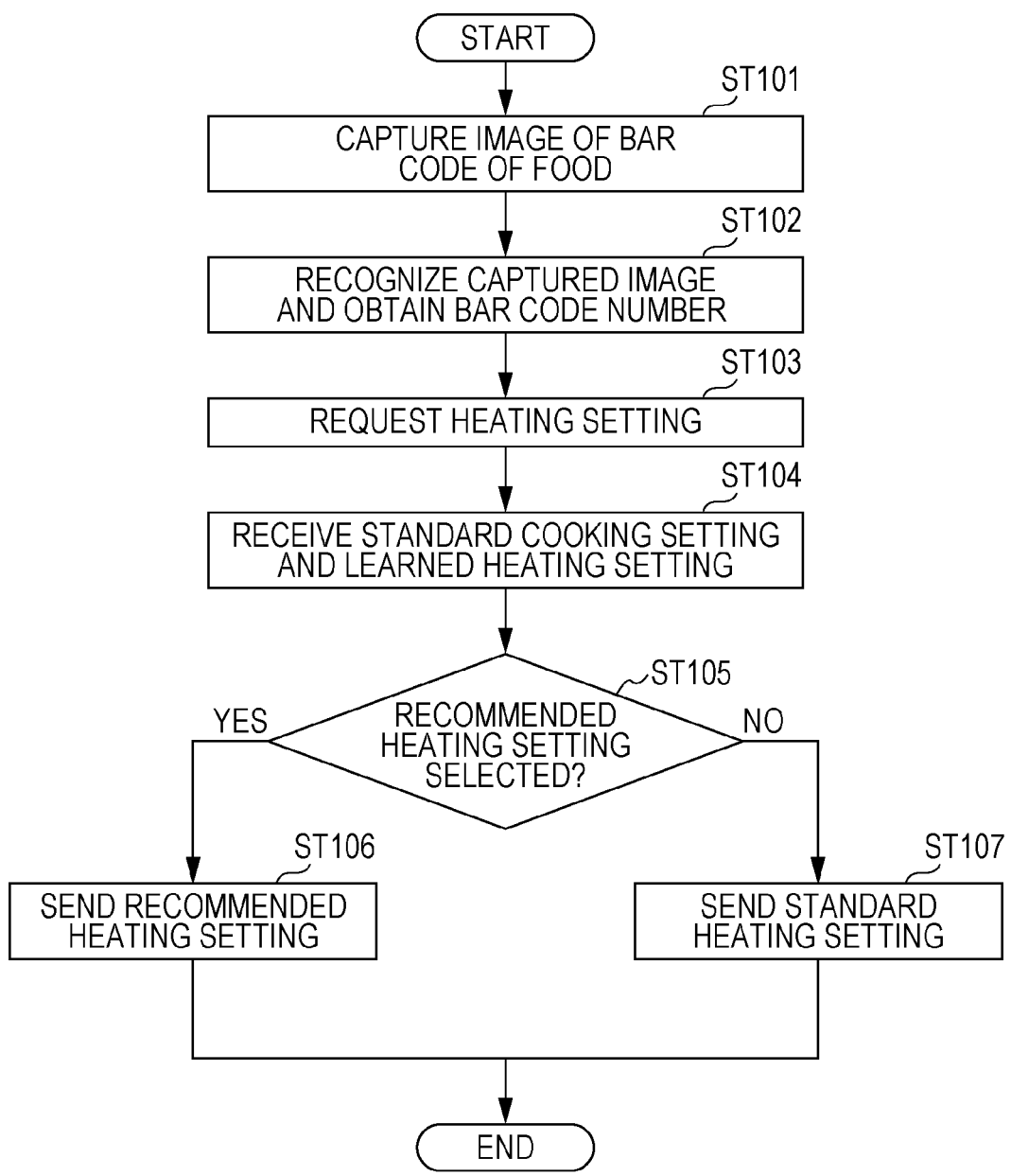

| GROUP | TOTAL HEATING USAGE COUNT |
|---|---|
| GROUP A | 1 – 5000 |
| GROUP B | 5001 – 10000 |
| GROUP C | 10001 – 15000 |
| GROUP D | 15001 – 20000 |

| GROUP | TOTAL HEATING USAGE COUNT | TOTAL OVEN USAGE COUNT |
|---|---|---|
| GROUP A | 1 - 5000 | 1 - 1000 |
| GROUP B | | 1001 - 2000 |
| GROUP C | | 2001 - 3000 |
| GROUP D | 5001 - 10000 | 1 - 1000 |
| GROUP E | | 1001 - 2000 |
| GROUP F | | 2001 - 3000 |
| GROUP G | 10001 - 15000 | 1 - 1000 |
| GROUP H | | 1001 - 2000 |
| GROUP I | | 2001 - 3000 |
| GROUP J | 15001 - 20000 | 1 - 1000 |
| GROUP K | | 1001 - 2000 |
| GROUP L | | 2001 - 3000 |

CONTROL METHOD, RECORDING MEDIUM, AND INFORMATION PROVIDING METHOD FOR TERMINAL DEVICE AND INFORMATION PROVIDING SYSTEM

BACKGROUND

1. Technical Field

The present disclosure relates to a control method, a recording medium, and an information providing method for a terminal device and an information providing system.

2. Description of the Related Art

A technique for downloading a cooking program into a home cooking appliance (also referred to as a "cooking apparatus") via the Internet has been developed.

For example, Japanese Unexamined Patent Application Publication No. 61-76825 describes a technique for reading a bar code printed on a package of food to obtain cooking program code and transferring the cooking program code to a microwave oven. The microwave oven reads a cooking program corresponding to the cooking program code and sets a cooking time. In addition, Japanese Unexamined Patent Application Publication No. 2006-153432 describes a technique for searching a server for a cooking recipe using information about a cooking appliance and usage history information (e.g., a heating method, a heating control pattern, and a heating time) as a key and acquiring a cooking recipe that matches the conditions. Furthermore, to present the recipes, Japanese Unexamined Patent Application Publication No. 2006-153432 also describes a technique for presenting a plurality of cooking recipes in the order of the most frequently selected one (the most popular one) to the least selected one under the same condition.

SUMMARY

In one general aspect, the techniques disclosed here feature a control method for controlling a terminal device connected to a first cooking appliance among a plurality of cooking appliances is provided. The terminal device includes a touch panel display. The method includes causing a computer of the terminal device to use a memory that manages cooking appliance logs each including at least a cooking time of a food and first information indicating an age-related deterioration level of one of the cooking appliances and acquire, from among candidates of a recommended cooking time that are calculated on the basis of the first information and the cooking times and that are stored in a server apparatus, third information indicating a recommended cooking time corresponding to second information indicating an age-related deterioration level of the first cooking appliance, causing the computer of the terminal device to display, on the display of the terminal device, a user interface that allows a user to select any one of the candidates of a cooking time including at least the recommended cooking time for the first cooking appliance using the third information, and upon detecting selection of one of the cooking times through an operation input to the user interface, causing the computer of the terminal device to output a setting command for setting the selected cooking time to the first cooking appliance.

According to the present disclosure, the cooking time optimum for a cooking appliance can be provided even when age-related deterioration of the cooking appliance occurs.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 1A illustrates an overview of an information providing system according to an exemplary embodiment of the present disclosure;

FIG. 3A illustrates an example of a database stored in a server apparatus according to an exemplary embodiment of the present disclosure;

FIG. 3B illustrates an example of a database stored in a server apparatus according to an exemplary embodiment of the present disclosure;

FIG. 4 is a flowchart of an example of a process for obtaining heating setting performed by a terminal device according to an exemplary embodiment of the present disclosure;

DETAILED DESCRIPTION

Figure 1B:
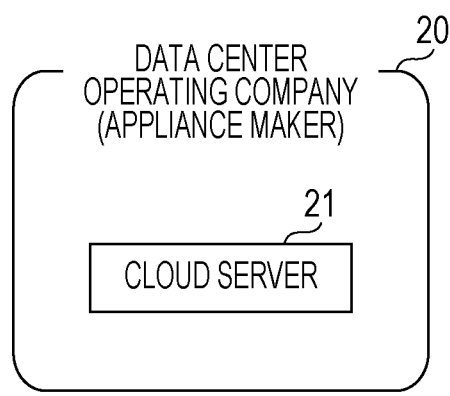
FIG. 1B illustrates a relationship between a data center operating company and an appliance maker in the information providing system according to an exemplary embodiment of the present disclosure.
Figure 1C:
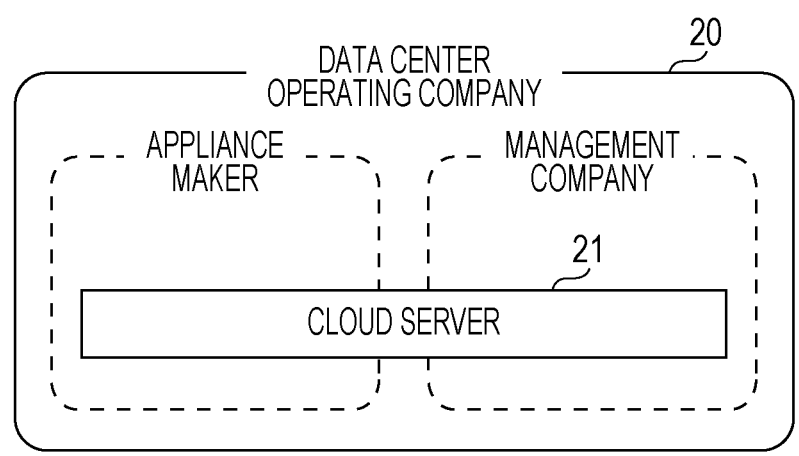
FIG. 1C illustrates a relationship among a data center operating company, an appliance maker, and a management company in the information providing system according to an exemplary embodiment of the present disclosure.

To discover the aspects of the present disclosure described below, the present inventors studied several points. These points are described below.

Underlying Knowledge Forming Basis of the Present Disclosure

The performance of a function provided by each of members that constitute a cooking appliance varies according to the usage time of the member or the usage count of the member. For example, a microwave oven, which is a typical example of a cooking appliance, includes a magnetron. For example, when food is cooked by heating using a microwave oven, heating power level (e.g., wattage) and heating time are set. The microwave oven controls the magnetron so that a microwave having a power level corresponding to the set heating power level is output for the heating time. If the food is placed in an area irradiated with the microwave, the food heats up. In this manner, the food is heated.

When cooking appliances are manufactured, the cooking appliances are designed so that the power of a microwave is maintained at a predetermined level corresponding to the set heating power level. However, it is empirically known that as the number of cooking operations with heat or the accumulated value of the heating time increases, the power level of a microwave output from the magnetron decreases. Hereinafter, a microwave oven having a power level of a microwave output from the magnetron that is lower than the design value due to an increased number of cooking operations or the accumulated value of the heating time is referred to as a "microwave oven that exhibits age-related deterioration in cooking performance" or an "age-deteriorated microwave oven".

For example, even when the same heating power level setting and heating time setting are set on a non-age deteriorated microwave oven and an age-deteriorated microwave oven for the same food, the temperatures of cooked food differ from each other. This is because the power level of a microwave output from the magnetron of the age deteriorated microwave oven drops from the design value and, thus, the amount of heat provided to the food during the cooking time is decreased.

However, cooking programs externally provided to the existing cooking appliances are created on the assumption that the performance of each of the cooking appliances is not age-deteriorated. That is, it is assumed that the power level of a microwave corresponding to the set heating power level is the same as the design value at all times.

In the configuration according to Japanese Unexamined Patent Application Publication No. 61-76825, a bar code printed on a cook book is scanned, and a cooking program corresponding to the bar code is transferred to the microwave oven. At that time, time-related deterioration of the cooking performance of the microwave oven is not taken into account. Accordingly, when the same bar code printed on a cook book is scanned, the same cooking program is transferred to the microwave oven regardless of whether the microwave oven is age-deteriorated or not. Thus, the temperatures of the same food cooked based on the same cooking time indicated by the cooking program differ from each other in accordance with the level of age-related deterioration of the microwave oven used, Such a technical issue needs to be addressed.

According to Japanese Unexamined Patent Application Publication No. 2006-153432, a cooking recipe is acquired from a server using information about a dish that stores food and usage history information (e.g., a heating method, a heating control pattern, and a heating time) as a key. That is, in Japanese Unexamined Patent Application Publication No, 2006-153432, if the same pair of the dish information and the usage history information serving as a key is used, the same recipe is acquired regardless of whether an oven that exhibits age-related deterioration in cooking performance is used or an oven that does not exhibit age-related deterioration in cooking performance is used. Accordingly, even when the same food is cooked using the same heating time indicated by the same recipe, the temperatures of food differ from each other in accordance with the age-related degradation levels. That is, such a technical issue arises.

The same applies to the other members of the cooking appliance used for cooking (e.g., a heater) in addition to the magnetron of a microwave oven. That is, if the heat output from a cooking member decreases from the design value with increasing number of cooking operations or increasing accumulated value of the heating time, the heat provided to the food decreases. Accordingly, the same technical issue arises.

That is, even when an age-deteriorated cooking appliance performs a cooking operation in accordance with the setting of a heating time indicated by a cooking program generated for a non-age deteriorated cooking appliance, the age-deteriorated cooking appliance cannot perform an optimum cooking operation. The solution to such a technical issue to provide a cooking program that takes into account the age-related deterioration has never been studied.

Accordingly, the present inventors conceive the idea of the following aspect of the present disclosure. That is, if cooking time setting in accordance with the age-related deterioration level of a cooking appliance can be set in the cooking appliance, even an age-deteriorated cooking appliance can heat food at a temperature that is substantially the same as in a non-age deteriorated cooking appliance.

According to an aspect of the present disclosure, a control method for controlling a terminal device connected to a first cooking appliance among a plurality of cooking appliances and having a touch panel display includes causing a computer of the terminal device to use a memory that manages cooking appliance logs each including at least a cooking time of a food and first information indicating an age-related deterioration level of one of the cooking appliances and acquire, from among candidates of a recommended cooking time that are calculated on the basis of the first information and the cooking times and that are stored in a server apparatus, third information indicating a recommended cooking time corresponding to second information indicating an age-related deterioration level of the first cooking appliance, causing the computer of the terminal device to display, on the display of the terminal device, a user interface that allows a user to select any one of the candidates of a cooking time including at least the recommended cooking time for the first cooking appliance using the third information, and upon detecting selection of one of the cooking times through an operation input to the user interface, causing the computer of the terminal device to output a setting command for setting the selected cooking time to the first cooking appliance.

According to such a configuration, the terminal device can set the cooking time on the first cooking appliance in accordance with the age-related deterioration of the first cooking appliance.

According to the aspect of the present disclosure, the control method further includes causing the computer of the terminal device to acquire, from the server apparatus, a standard cooking time of a food to be cooked by the first cooking appliance, causing the computer of the terminal device to display, on the display, the user interface including an icon corresponding to the standard cooking time and an icon corresponding to the recommended cooking time, and upon detecting selection of one of the icon corresponding to the standard cooking time and the icon corresponding to the recommended cooking time, causing the computer of the terminal device to output, to the first cooking appliance, as the setting command, a setting command for setting a cooking time corresponding to the selected icon.

According to such a configuration, a user who uses the terminal device can see the standard cooking time and the recommended cooking time displayed on the display. In addition, the cooking time corresponding to the selected icon can be set in the first cooking appliance.

According to the aspect of the present disclosure, the control method further includes causing the computer of the terminal device to acquire, from the server apparatus, the candidates of the recommended cooking time each corresponding to one of the age-related deterioration levels of the cooking appliances, causing the computer of the terminal device to display, on the display, the user interface including a relationship between the age-related deterioration level and the candidate of the recommended cooking time and an area of the recommended cooking time for the first cooking appliance in the displayed relationship, and upon detecting selection of the area of the recommended cooking time for the first cooking appliance, causing the computer of the terminal device to output, to the first cooking appliance, as the setting command, a setting command for setting a cooking time corresponding to the recommended cooking time.

According to such a configuration, a user who uses the terminal device can see the relationship between the age-related deterioration level and the recommended cooking time and the area of the recommended cooking time for the first cooking appliance in the displayed relationship using the display. In addition, the cooking time corresponding to the recommended cooking time for the first cooking appliance can be set on the first cooking appliance.

According to the aspect of the present disclosure, the control method further includes causing the computer of the terminal device to acquire, from the server apparatus, the candidates of the recommended cooking time each corresponding to one of the age-related deterioration levels of the cooking appliances, causing the computer of the terminal device to display, on the display, the user interface including a relationship between the age-related deterioration level and the candidate of the recommended cooking time and an area of the recommended cooking time for the first cooking appliance in the displayed relationship, and upon detecting a touch operation performed on a display screen displaying the relationship through an operation input to the user interface, causing the computer of the terminal device to identify the recommended cooking time on the basis of a touched position in the display screen and output, to the first cooking appliance, as the setting command, a setting command for setting a cooking time corresponding to the identified recommended cooking time.

According to such a configuration, a user who uses the terminal device can see the relationship between the age-related deterioration level and the candidate of the recommended cooking time and an area of the recommended cooking time for the first cooking appliance in the displayed relationship. In addition, the user can set the cooking time corresponding to the recommended cooking time that differs from the cooking time corresponding to the recommended cooking time for the first cooking appliance.

According to the aspect of the present disclosure, the third information indicates an extension ratio of the recommended cooking time to a standard cooking time for a food, and the control method further includes causing the computer of the terminal device to acquire, from the server apparatus, the standard cooking time of a food to be cooked by the first cooking appliance; and causing the computer of the terminal device to display, on the display, the user interface including an extension time that is applied to the standard cooking time and that is calculated on the basis of the standard cooking time and the extension ratio and the age-related deterioration level of the first cooking appliance visualized in accordance with the second information.

According to such a configuration, the user who uses the terminal device can be aware of the age-related deterioration level of the first cooking appliance by viewing the age-related deterioration level of the first cooking appliance visualized and displayed on the display.

According to the aspect of the present disclosure, the first information includes a total usage count of a first cooking function and a total usage count of a second cooking function of each of the cooking appliances, the second information includes a total usage count of the first cooking function and a total usage count of the second cooking function of the first cooking appliance, and the third information indicates an extension ratio of the recommended cooking time to the standard cooking time of a food for the first cooking function of the first cooking appliance, and the control method further includes causing the computer of the terminal device to acquire, from the server apparatus, the standard cooking time of a food to be cooked by the first cooking appliance using the first cooking function; and causing the computer of the terminal device to display, on the display, the user interface including an extension time that is applied to the standard cooking time and that is calculated on the basis of the standard cooking time and the extension ratio, a usage trend of the first cooking function of the first cooking appliance corresponding to the second information, and a usage trend of the second cooking function of the first cooking appliance corresponding to the second information.

According to such a configuration, the extension time can be set for the first cooking appliance in accordance with the usage trend of the first cooking function and the usage trend of the second cooking function of the first cooking appliance.

According to the aspect of the present disclosure, the first information indicates a total usage count of a cooking function of each of the cooking appliances, the second information indicates a total usage count of a cooking function of the first cooking appliance. A plurality of groups are formed by dividing the cooking appliance logs into groups based on a predetermined range of the total usage count, and the candidate of the recommended cooking time is the ratio of an average of the cooking times of each of the groups to an average of the cooking times of a group having the lowest total usage count.

According to such a configuration, the third information including the ratio of the average of the cooking times of a group that has the total usage count of the cooking function of the first cooking appliance in its range can be acquired from the server apparatus.

According to the aspect of the present disclosure, the first information indicates a first total usage count of a first cooking function and a second total usage count of a second cooking function of each of the cooking appliances, and the second information indicates a total usage count of the first cooking function and a total usage count of the second cooking function of the first cooking appliance. A plurality of groups are formed by dividing the cooking appliance logs of the cooking appliances based on a pair consisting of the first total usage count and the second total usage count, and the candidate of the recommended cooking time of the first cooking function is the ratio of the average of the cooking times of the first cooking function of each of the groups to the average of the cooking times of the first cooking function of the groups corresponding to the pair having the lowest first total usage count and the lowest second total usage count.

According to such a configuration, the third information including the ratio of the average of the cooking times of the group that has the total usage count of the first cooking function and the total usage count of the second cooking function of the first cooking appliance in the ranges of the group can be acquired from the server apparatus.

According to another aspect of the present disclosure, a non-transitory computer-readable recording medium stores a program for use in a terminal device connected to a first cooking appliance among a plurality of cooking appliances, the terminal device having a touch panel display. The program causes a computer of the terminal device to perform, by using a memory that manages cooking appliance logs each including at least a cooking time of a food and first information indicating an age-related deterioration level of one of the cooking appliances, acquiring, from among candidates of a recommended cooking time that are calculated on the basis of the first information and the cooking times and that are stored in a server apparatus, third information indicating a recommended cooking time corresponding to second information indicating an age-related deterioration level of the first cooking appliance, displaying, on the display, a user interface that allows a user to select any one of the candidates of a cooking time including at least the recommended cooking time for the first cooking appliance using the third information, and outputting, to the first cooking appliance, a setting command for setting the selected cooking time upon detecting selection of one of the cooking times through an operation input to the user interface.

According to such a configuration, the terminal device can set the cooking time for the first cooking appliance in accordance with the age-related deterioration of the first cooking appliance.

According to still another aspect of the present disclosure, a terminal device connected to a first cooking appliance among a plurality of cooking appliances is provided. The terminal device includes a touch panel display. The terminal device includes an obtaining unit that uses a memory that manages cooking appliance logs each including at least a cooking time of a food and first information indicating an age-related deterioration level of one of the cooking appliances and acquires, from among candidates of a recommended cooking time that are calculated on the basis of the first information and the cooking times and that are stored in a server apparatus, third information indicating a recommended cooking time corresponding to second information indicating an age-related deterioration level of the first cooking appliance, a display that displays a user interface for allowing a user to select any one of the candidates of a cooking time including at least the recommended cooking time for the first cooking appliance using the third information, and a setting unit that upon detecting selection of one of the cooking times through an operation input to the user interface, outputs a setting command for setting the selected cooking time to the first cooking appliance.

According to such a configuration, the terminal device can set the cooking time on the first cooking appliance in accordance with the age-related deterioration of the first cooking appliance.

According to the aspect of the present disclosure, the terminal device having the display is connected to the first cooking appliance via a network.

According to such a configuration, the terminal device can set the cooking time on the first cooking appliance in accordance with the age-related deterioration of the first cooking appliance via a network.

According to yet still another aspect of the present disclosure, an information providing method for use in an information providing system connected, via a network, to a plurality of terminal devices each communicably connected to one of a plurality of cooking appliances is provided. The information providing system manages information regarding the cooking appliances. The method includes receiving, from each of the terminal devices, a cooking appliance log including a cooking time of a food cooked by the cooking appliance controlled by the terminal device and first information indicating an age-related deterioration level of the cooking appliance controlled by the terminal device via the network, calculating candidates of a recommended cooking time each corresponding to one of the age-related deterioration levels on the basis of the first information and the cooking time using a first memory that collects and manages the received cooking appliance logs and storing, in a second memory, third information indicating the candidates of the recommended cooking time each corresponding to one of the age-related deterioration levels, searching the second memory for the third information corresponding to second information received from a first terminal among the plurality of terminal devices and indicating the age-related deterioration level of a first cooking appliance connected to the first terminal device and sending the third information to the terminal device, and displaying, on a touch panel display of the terminal device connected to the first cooking appliance, a user interface that allows a user to select any one of the candidates of a cooking time including at least the recommended cooking time for the first cooking appliance using the third information.

According to such a configuration, since the cooking time in accordance with the age-related deterioration of the first cooking appliance can be provided, the terminal device can set the cooking time in accordance with the age-related deterioration of the first cooking appliance on the first cooking appliance.

Exemplary Embodiments

Exemplary embodiments are described in detail below with reference to the accompanying drawings.

Each of the embodiments described below is a particular example of the present disclosure. A value, a shape, a material, a constituent element, the positions and the connection form of the constituent elements, steps, and the sequence of steps described in the embodiments are only examples and shall not be construed as limiting the scope of the present disclosure. In addition, among the constituent elements in the embodiments described below, the constituent element that does not appear in an independent claim, which has the broadest scope, is described as an optional constituent element. Furthermore, all the embodiments may be combined in any way.

Overview of Services Provided

FIG. 1A illustrates an overview of an information providing system according to an exemplary embodiment of the present disclosure.

A group 10 is, for example, a company, an organization, or a household, and may be of any size. The group 10 includes an appliance A and an appliance B, which are appliances of a plurality of appliances 11, and a home gateway 12.

Although not illustrated in FIG. 1A, like the group 10, a group other than the group 10 includes a plurality of appliances and a home gateway. Hereinafter, the group 10 is described below. Since a group other than the group 10 has the same configuration as the group 10, detailed description of the group is not repeated. The appliance A, which is one of a plurality of appliances 11 of the group 10, can be connected to, for example, the Internet. Examples of the appliance A include a smartphone, a personal computer (PC), and a TV set. The appliance B, which is also one of a plurality of appliances 11 of the group 10, cannot be connected to the Internet by itself. Examples of the appliance B include a microwave oven, lighting equipment, a laundry machine, or a refrigerator). A appliance 11 (in particular, the appliance A), a home gateway 12, and a cloud server 21 are communicably connected to one another via the Internet. The appliance A, the appliance B, and the home gateway 12 are communicably connected to one another via a home network. The home network may be a wireless network or a wired network. Although the appliance B cannot be connected to the Internet, the appliance B is communicably connected to the home gateway 12 or the appliance A (e.g., a smartphone) via, for example, the home network. By being connected to the home gateway 12 or the appliance A via the home network, the appliance B can be connected to the Internet via the appliance A or the home gateway 12. The appliance A and the home gateway 12 are communicably connected to the cloud server 21 via the Internet. Accordingly, the appliance B is communicably connected to the cloud server 21 via the appliance A or the home gateway 12. In this manner, the appliance 11, which is either the appliance A or the appliance B, can be communicably connected to the cloud server 21 via the Internet. In addition, the group 10 includes a user 1 who uses the plurality of appliances 11.

A data center operating company 20 has the cloud server 21 disposed therein. The cloud server 21 is a virtual server that works with a variety of appliances via the Internet. The cloud server 21 manages a vast amount of data that is difficult to handle with ordinary database management tools (i.e., big data). The data center operating company 20 performs management of data and management of the cloud server 21 and operates a data center for managing the data and the cloud server 21. The services provided by the data center operating company 20 are described in more detail below. Note that the data center operating company 20 is not limited to a company that performs only management of data and management of the cloud server 21.

FIG. 1B illustrates a relationship between a data center operating company and an appliance maker in the information providing system according to an exemplary embodiment of the present disclosure. For example, if the appliance maker that develops and manufactures one of the appliances 11 also performs management of data and management of the cloud server 21, the appliance maker corresponds to the data center operating company 20.

Figure 10:
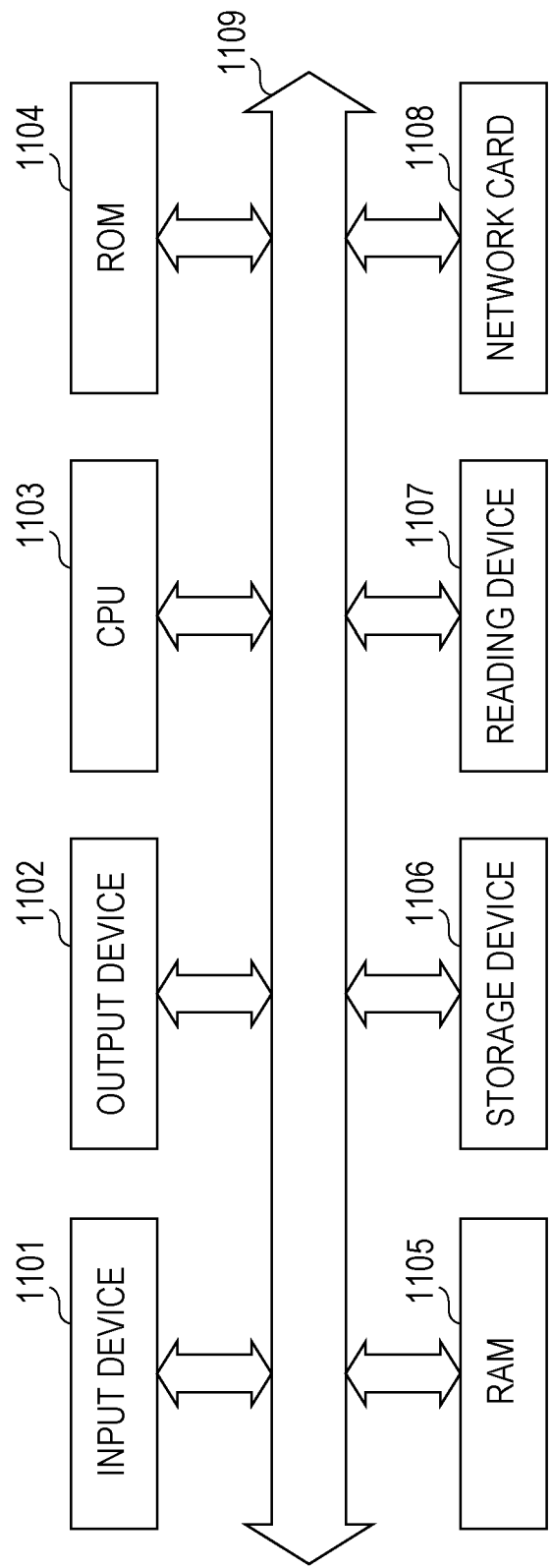
FIG. 10 illustrates an example of the hardware configuration of a computer according to an exemplary embodiment of the present disclosure.

In addition, the data center operating company 20 is not limited to only one company. FIG. 10 illustrates a relationship among a data center operating company, an appliance maker, and a management company in the information providing system according to an exemplary embodiment of the present disclosure. For example, if the appliance maker and another management company performs management of data or operates the cloud server 21 in a mutual or shared manner, one or both of the appliance maker and another management company corresponds to the data center operating company 20.

A service provider 30 owns a server 31. The server 31 is of any size. For example, a memory of a personal PC may serve as the server 31. Alternatively, in some cases, the service provider 30 does not own the server 31.

Note that the home gateway 12 is not always necessary for the above-described services. For example, if the cloud server 21 manages all the data, the need for the home gateway 12 can be eliminated. In addition, as the case in which all of appliances in a home are connected to the Internet, there is a case in which an appliance that cannot be connected to the Internet by itself does not exist.

The flow of information in the above-described service is described below.

The appliance A or the appliance B of the group 10 sends log information to the cloud server 21 of the data center operating company 20. The cloud server 21 accumulates the log information regarding the appliance A or the appliance B (refer to an arrow (a) of FIG. 1A), The log information indicates, for example, the operating conditions and the operating date and time of each of the appliances 11. Examples of the log information includes the viewing history of a TV set, video recording timer information for a recorder, the operating date and time of a laundry machine, the amount of laundry, the date and time at which the door of a refrigerator is open/closed, and the number of door open/close operations performed on the refrigerator. Note that the log information is not limited to these examples. All the information receivable from all the appliances can serve as the log information. The log information may be directly provided from each of the appliances 11 to the cloud server 21 via the Internet. Alternatively, the log information from each of the appliances 11 may be temporarily accumulated in the home gateway 12 and, thereafter, may be provided from the home gateway 12 to the cloud server 21. Still alternatively, the log information from each of the appliances 11 may be temporarily accumulated in another appliance connectable to the Internet and, thereafter, may be provided from the appliance to the cloud server 21.

Subsequently, the cloud server 21 of the data center operating company 20 provides the accumulated log information to the service provider 30 by dividing the accumulated log information into predetermined lengths. The length of the log information may be a length with which the data center operating company can organize the accumulated information and provide the information to the service provider 30 or a length required by the service provider 30.

The predetermined length need not be always fixed. That is, the amount of information provided may be changed as needed. The log information is stored in the server 31 of the service provider 30 as needed (refer to an arrow (b) of FIG. 1A). Thereafter, the service provider 30 organizes the log information into information that suits for the service provided to the user, and the information is provided to the user. The user may be the user 1 who uses a plurality of the appliances 11 or a user 2 outside the group. The service may be provided from the service provider to the user via the Internet (refer to arrows (e) and (f) of FIG. 1A). Alternatively, the service may be provided to the user via, for example, the cloud server 21 of the data center operating company 20 again (refer to arrows (c) and (d) of FIG. 1A). Still alternatively, the cloud server 21 of the data center operating company 20 may organize the log information into information that suits for the service provided to the user, and the information may be provided to the service provider 30.

Note that the user 1 may be the same as the user 2 or different from the user 2.

Exemplary Embodiment

Configuration of Information Providing System

Figure 2:
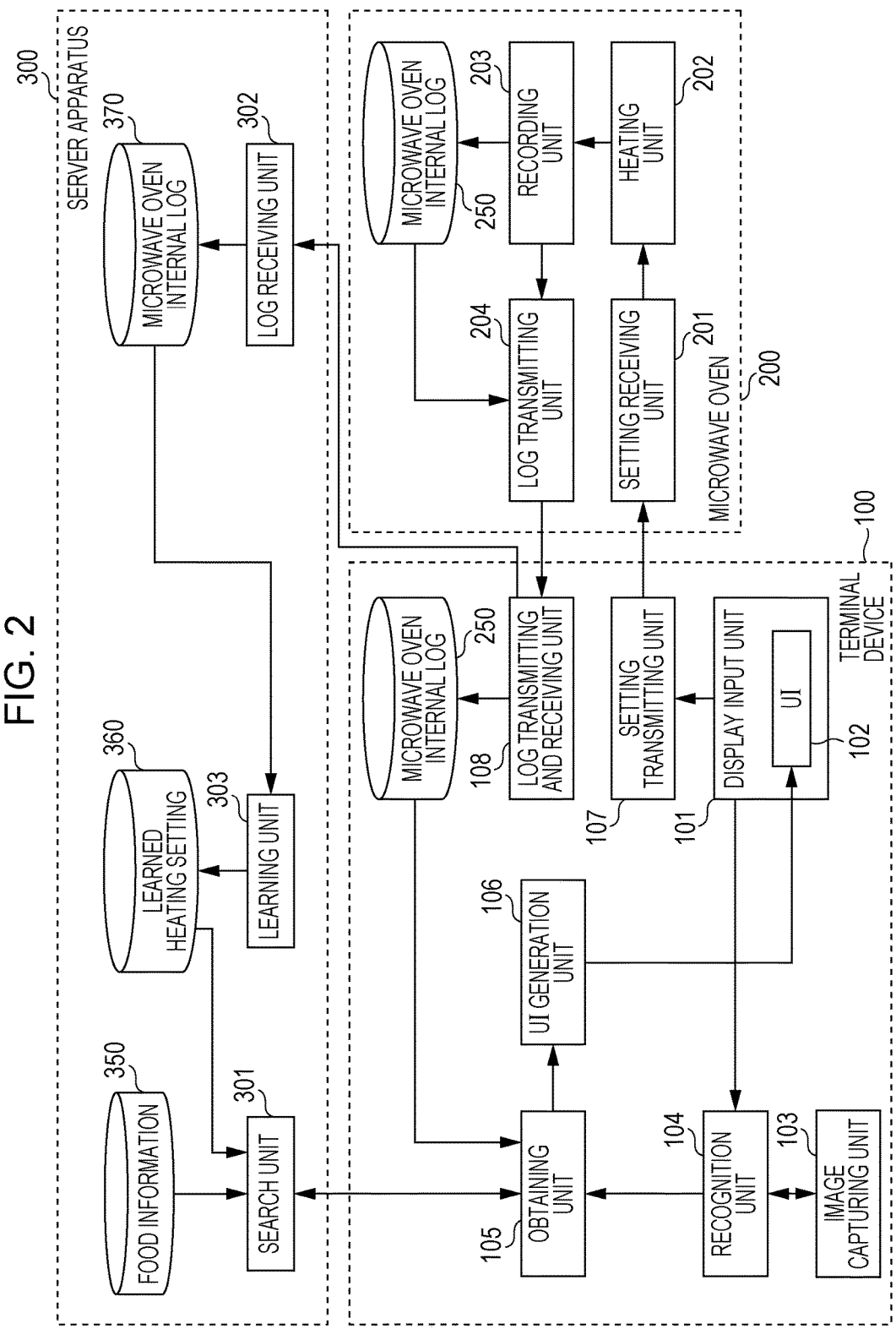
FIG. 2 is a block diagram of the configuration of the information providing system according to an exemplary embodiment of the present disclosure.

FIG. 2 is a block diagram of the configuration of the information providing system according to an exemplary embodiment of the present disclosure. As illustrated in FIG. 2, the information providing system includes a terminal device 100 corresponding to a first terminal device that presents a recommended cooking program (cooking setting) to the user, a microwave oven 200 corresponding to a first cooking appliance (a first microwave oven), and a server apparatus 300. The server apparatus 300 holds recommended cooking programs. In FIG. 2, the terminal device 100 is an example of the appliance 11 of the group 10 illustrated in FIG. 1A. More specifically, the terminal device 100 corresponds to, for example, the appliance A that can be connected to the Internet illustrated in FIG. 1A (e.g., a smartphone). In addition, the microwave oven 200 is an example of the appliance 11 of the group 10 illustrated in FIG. 1A. More specifically, the microwave oven 200 corresponds to the appliance B that cannot be connected to the Internet illustrated in FIG. 1A. In addition, the microwave oven 200 is communicably connected to, for example, the appliance A or the home gateway illustrated in FIG. 1A via the home network. The server apparatus 300 corresponds to the cloud server 21 or the server 31 illustrated in FIG. 1A. In addition, although not illustrated in FIG. 2, at least one of the microwave ovens other than the microwave oven 200 is communicably connected to the server apparatus 300 via the Internet.

Hereinafter, the microwave oven other than the microwave oven 200 is referred to as a "second microwave oven (a second cooking appliance)". The terminal device 100 may be, for example, the appliance A of the group 10 illustrated in FIG. 1A. In addition, the second microwave oven may be, for example, the appliance B of the group 10 illustrated in FIG. 1A. In such a case, the second microwave oven is communicably connected to the appliance A or the home gateway via the home network of the group 10. In addition, the second microwave oven may be, for example, an appliance A of a group other than the group 10 illustrated in FIG. 1A. Furthermore, the second microwave oven may be, for example, an appliance B of a group other than the group 10 illustrated in FIG. 1A. In such a case, the second microwave oven is communicably connected to the appliance A (e.g., the second terminal device) or a home gateway of the group other than the group 10 via the home network of a group other than the group 10. The configuration of the second microwave oven is the same as that of the microwave oven 200 (described in more detail below). Accordingly, detailed description of the configuration is not repeated.

Note that the following description is provided with reference to the microwave function (a heating operation) as the cooking function of the microwave oven 200. That is, the cooking program sent from the server apparatus 300 to the terminal device 100 contains the setting of a cooking time (a heating time) to be set in the microwave oven 200. However, the cooking function of the microwave oven is not limited to the microwave function. For example, the present exemplary embodiment may be applied to the following cooking function: an oven, grill, or steam function.

Configuration of Terminal Device

A display input unit 101 of the terminal device 100 displays, on, for example, a touch panel display, a user interface (UI) 102 for presenting information to the user and receiving a variety of operations performed by the user. More specifically, by using the information (the heating setting) sent from the server apparatus 300, the display input unit 101 displays the UI 102 for allowing the user to select any one of the candidates of a cooking time including at least a recommended cooking time for the microwave oven 200. In addition, upon receiving a physical operation performed by the user (e.g., a touch operation performed on the touch panel display), the display input unit 101 performs a variety of processes and outputs the result of the processes to the UI 102 and a recognition unit 104. For example, the display input unit 101 sends, to the recognition unit 104, a message indicating that a user operation requesting start of a bar code recognition function has been received. In addition, the display input unit 101 outputs the heating setting input through the UI 102 (the heating setting selected by the user) to a setting transmitting unit 107. For example, the display input unit 101 is a touch panel. The UI 102 is described in more detail below.

An image capturing unit 103 captures the image of a food or the image including the image of the package of the food to obtain image data and outputs the image data to the recognition unit 104. For example, the image capturing unit 103 obtains image data including the bar code printed on the package of a food.

The recognition unit 104 analyzes the image data received from the image capturing unit 103 and recognizes the food in the image captured by the image capturing unit 103. For example, upon receiving the image data including the bar code, the recognition unit 104 analyzes the image data of the bar code and converts the image data into a number corresponding to the bar code (a bar code number). Note that to recognize the bar code, an existing image analysis technique can be used. Thereafter, the recognition unit 104 outputs the obtained information (e.g., the bar code number) to an obtaining unit 105. Note that the bar code is an example of information used for recognizing a food. The information used for recognizing a food is not limited to a bar code. For example, the recognition unit 104 may uniquely identify the food on the basis of the image of the food or the image of the entire package of the food.

According to the present exemplary embodiment, the cooking appliance communicably connected to the terminal device 100 is the microwave oven 200. The information obtained when a food is cooked using the microwave oven 200 is stored in the microwave oven 200 as a cooking appliance log. A microwave oven internal log 250 corresponding to the cooking appliance log (described in more detail below) is sent from the microwave oven 200 to the terminal device 100. The obtaining unit 105 requests the recommended heating setting from the server apparatus 300 (a search unit 301) using, as a key, the data included in the microwave oven internal log 250 most recently received from the microwave oven 200. In contrast, the server apparatus 300 manages, in a memory thereof, a microwave oven internal log 370 generated from the cooking appliance logs pre-collected from a plurality of microwave ovens including the microwave oven 200 and at least one second microwave oven. The microwave oven internal log 370 is described in more detail below. For each of the microwave ovens included in the microwave oven internal log 370, the server apparatus 300 selects, from among the candidates of the recommended heating time calculated on the basis of the information indicating the age-related deterioration of the microwave oven (e.g., the total usage count or total usage time) and the heating time of the food preset for each of the microwave ovens, information indicating the recommended heating time (recommended heating setting) corresponding to the information indicating the age-related deterioration of the microwave oven 200 (e.g., the total usage count or total usage time). The server apparatus 300 sends the selected recommended heating setting to the terminal device that has requested the recommended heating setting (i.e., the terminal device 100 in this example). Thereafter, the obtaining unit 105 outputs, to a UI generation unit 106, the recommended heating setting sent from the server apparatus 300 in response to the request.

In addition, the obtaining unit 105 requests food information (i.e., the food information corresponding to the bar code number) (described below) from the server apparatus 300 (the search unit 301) using the information received from the recognition unit 104 (e.g., the bar code number) as a key. Thereafter, the obtaining unit 105 outputs, to the UI generation unit 106, the food information received from the server apparatus 300 in response to the request.

Note that the "food information" includes, for example, the bar code number, the quantity of food, a standard heating power level (wattage), and the standard heating time. Note that the standard heating power level is the power level (wattage) of the microwave oven recommended when the food corresponding to the bar code number is heated on the assumption that the microwave oven is not age-deteriorated. In addition, the standard heating time is the length of time recommended for heating the food corresponding to the bar code number with the standard heating power level on the assumption that the microwave oven is not age-deteriorated. Furthermore, the "recommended heating setting" includes the heating time (the cooking time) corresponding to the age-related deterioration of the microwave oven. For example, the recommended heating setting represents the heating time that is more suitable than the standard heating time of the food (a recommended heating time) or an increase ratio of the recommended heating time to the standard heating time of the food (hereinafter also referred to as an "extension ratio" of the recommended heating time to the standard heating time).

The UI generation unit 106 generates the UI 102 using the food information received from the obtaining unit 105 (e.g., the standard heating time) and the recommended heating setting (the recommended heating time). For example, the UI generation unit 106 generates the UI 102 that allows the user to select one of the standard heating time indicated by the food information and the heating time obtained through a learning process using the microwave oven internal log 250 (the recommended heating time). The UI generation unit 106 outputs the generated UI 102 to the display input unit 101.

The setting transmitting unit 107 outputs, to the network connected to the microwave oven 200, a setting command for causing the microwave oven 200 (a setting receiving unit 201 described below) to set the heating setting selected in the UI 102. Thus, the setting command is sent to the microwave oven 200 via the network. In this manner, the heating time selected through the operation input by the user using the UI 102 is set in the microwave oven 200. For example, the setting command for setting the heating setting (the cooking setting) includes information regarding the heating power level (e.g., wattage) and the heating time (the cooking time). By pressing a button (not illustrated) for starting a heating operation performed by the microwave oven 200 with the heating setting, the user can perform the heating operation. Alternatively, the setting command may contain a command for instructing start of a heating operation. In this manner, the user can remotely operate the microwave oven 200 using the terminal device 100 to set the heating setting and start the heating operation. Note that the terminal device 100 and the microwave oven 200 communicate with each other using a wireless communication channel (a network), such as Near Field Communication (NFC), Wi-Fi (trade name), or Bluetooth (trade name).

Alternatively, the terminal device 100 and the microwave oven 200 may communicate with each other using, for example, a wired communication channel (or a wired network).

A log transmitting and receiving unit 108 receives the microwave oven internal log 250 (described in more detail below) sent from the microwave oven 200 (a log transmitting unit 204) and sends the received microwave oven internal log 250 to the server apparatus 300 (a log receiving unit 302 described below). In addition, the received microwave oven internal log 250 is collected and stored in the form of a database. The database of the collected microwave oven internal log 250 is managed in the memory of the terminal device 100. As used herein, the term "memory" refers to, for example, a random access memory (RAM), a hard disk, or a combination of the both. Note that the terminal device 100 and the server apparatus 300 communicate with each other using, for example, the Internet.

Configuration of Microwave Oven

The cooking appliance is described below with reference to a microwave oven as an example.

Note that the cooking appliance is not limited to a microwave oven. For example, any cooking appliance that provides a desired cooking function using electric power can be the cooking appliance.

The setting receiving unit 201 of the microwave oven 200 receives a setting command corresponding to the heating setting from the terminal device 100 (the setting transmitting unit 107). The setting receiving unit 201 instructs a heating unit 202 to perform an operation corresponding to the heating setting indicated by the setting command.

The heating unit 202 performs a heating operation in accordance with the setting command corresponding to the heating setting received from the setting receiving unit 201. For example, the heating unit 202 performs a heating operation using equipment similar to that in a widely used microwave oven including a magnetron. For example, upon receiving the setting command, the heating unit 202 sets the heating time and the heating power level for the microwave oven 200. The heating unit 202 heats or cooks the food using a magnetron with the set heating power level for the set heating time. Note that the intensity of an electromagnetic wave output from the magnetron on the basis of the set heating power level decreases in accordance with the age-related deterioration.

A recording unit 203 stores the information regarding the heating operation performed by the heating unit 202 in the microwave oven internal log 250. In addition, the recording unit 203 sends, to the log transmitting unit 204, a message indicating that the log has been recorded in the microwave oven internal log 250.

Upon receiving the message indicating that a log has been recorded in the microwave oven internal log 250 from the recording unit 203, the log transmitting unit 204 sends the microwave oven internal log 250 to the terminal device 100 (the log transmitting and receiving unit 108).

The microwave oven internal log 250 includes a log indicating at what time and at which heat level (e.g., wattage and duration) the microwave oven 200 performed a heating operation. The microwave oven internal log 250 is stored in the form of, for example, a database. For example, the database is managed in the memory (a storage unit) of the microwave oven 200. In addition, the microwave oven internal log 250 includes information regarding how many times the microwave oven 200 performed a heating operation in total after the beginning of use (or the purchase of the microwave oven 200) (the total usage count) and how long the heating operation was performed in total after the beginning of use (or the purchase of the microwave oven 200) (the total usage time). According to the present exemplary embodiment, the microwave oven internal log 250 includes at least the heating time during which the microwave oven 200 heated foods and information indicating the age-related deterioration of the microwave oven 200 (the total usage count or the total usage time). Note that if the microwave oven 200 has a function other than the heating function (the microwave function) (cooking menus, for example, oven, grill, and steam functions), a log related to the total usage count or the total usage time is collected for each of the cooking menus.

Configuration of Server Apparatus

The search unit 301 of the server apparatus 300 searches the database of the learned heating setting 360 using the microwave oven internal log 250 received from the terminal device 100 (the obtaining unit 105) as a key so as to acquire the learned heating setting corresponding to the key. That is, the search unit 301 reads out, from the database of the learned heating setting 360 that stores information indicating the candidates of the recommended heating time each corresponding to one of age-related deterioration levels of the microwave oven 200, the information indicating the recommended heating time corresponding to the information indicating the age-related deterioration of the microwave oven 200 received from the terminal device 100. An example of information indicating the age-related deterioration of the microwave oven 200 is the total usage count. The information indicating the recommended heating time is the recommended heating setting (e.g., the above-described extension ratio). The database of the learned heating setting 360 contains information indicating the candidates of the recommended heating time each corresponding to one of the age-related deterioration levels of the microwave oven 200. In addition, the search unit 301 searches the database of the food information 350 using the information received from the terminal device 100 (the obtaining unit 105) (e.g., the bar code number) as a key so as to acquire the food information corresponding to the key. Thereafter, the search unit 301 sends the acquired food information and recommended heating setting to the terminal device 100 (the obtaining unit 105).

Note that the search unit 301 may directly send the acquired recommended heating setting (the extension ratio) to the terminal device 100 or may send the recommended heating time calculated using the recommended heating setting (the extension ratio) to the terminal device 100. At that time, the recommended heating time can be obtained by multiplying the standard heating time by the extension ratio.

The log receiving unit 302 receives the microwave oven internal log 250 sent from the terminal device 100 (the log transmitting and receiving unit 108) and stores the microwave oven internal log 250 in the database of the microwave oven internal log 370. In addition, the log receiving unit 302 receives, from one or more second microwave ovens, the microwave oven internal log of the second microwave oven. The received microwave oven internal log is collected and stored in the database of the microwave oven internal log 370. That is, the log receiving unit 302 receives the microwave oven internal log corresponding to each of the plurality of microwave ovens. The received microwave oven internal log is collected into the database of the microwave oven internal log 370. The database of the microwave oven internal log 370 is managed in the memory (not illustrated) of the server apparatus 300. As used herein, the term "memory" refers to, for example, a RAM, a hard disk, or a combination of the both. The database of the microwave oven internal log 370 contains at least the information indicating the heating time required for each of the microwave ovens to cook a food and the age-related deterioration level of each of the microwave ovens (e.g., the total usage count).

By analyzing the microwave oven internal log 370, the learning unit 303 learns settings for heating a food to a temperature that is more desirable than the standard heating time. The learning unit 303 stores the heating setting obtained through the learning (learned heating setting) in the database of the learned heating setting 360. The database of the learned heating setting 360 is managed in, for example, the memory of the server apparatus 300. As used herein, the term "memory" refers to, for example, a RAM, a hard disk, or a combination of the both. A learning unit 303 calculates the candidates of the recommended heating time (e.g., the extension ratios) each corresponding to one of the above-described age-related deterioration levels on the basis of the information indicating the age-related deterioration levels of the microwave ovens (e.g., the total usage counts) and the heating times stored in the microwave oven internal logs 370 of the microwave ovens. Thereafter, the learning unit 303 stores the information indicating the candidates of the recommended heating time each corresponding to the above-described age-related deterioration levels in the memory (the database of the learned heating setting 360). For example, if the total usage count of the microwave function stored in the microwave oven internal log 370 is focused on, the learning unit 303 divides the logs in the microwave oven internal log 370 into groups based on a range of total usage counts. Then, the learning unit 303 selects, as a candidate of the recommended heating time, the ratio of the average of the heating times of each of the groups to the average of the heating time of the group having the lowest total usage count (the extension ratio).

Alternatively, to calculate the candidates of the recommended heating time, the learning unit 303 may use the total usage count of the heating function and the total usage count of another function (e.g., the oven function). In such a case, the learning unit 303 divides the logs in the microwave oven internal log 370 into groups based on a pair consisting of a range of the total usage counts of the microwave function and a range of the total usage counts of the oven function. Then, the learning unit 303 selects, as a candidate of the recommended heating time, the ratio of the average of the heating times of each of the groups to the average of the heating times of the group corresponding to the pair having the lowest total usage count of the microwave function and the lowest total usage count of the oven function (the extension ratio).

FIG. 3A illustrates an example of the database stored in a server apparatus according to an exemplary embodiment of the present disclosure. More specifically, FIG. 3A illustrates an example of the information in a database that stores the food information 350.

As illustrated in FIG. 3A, the food information 350 is data formed as a set of, for example, the bar code number, the product name (the food name), the maker, the quantity of food, the standard heating power level, and the standard heating time. For example, the food information 350 is separately collected and is stored in the database. The database of the food information 350 is managed in, for example, the memory of the server apparatus 300. As used herein, the term "memory" of the server apparatus 300 refers to, for example, a RAM, a hard disk, or a combination of the both.

The learned heating setting 360 is obtained by the learning unit 303 through learning. The learned heating setting 360 has the optimum heating setting (the recommended heating setting) associated with an age-related deterioration level of the microwave oven 200. The result of learning performed by the learning unit 303 is collected and stored in the database of the learned heating setting 360. The database of the learned heating setting 360 is managed in, for example, the memory of the server apparatus 300. As used herein, the term "memory" of the server apparatus 300 refers to, for example, a RAM, a hard disk, or a combination of the both. For example, the learned heating setting 360 is formed from a pair consisting of the total usage count (the total usage time) and the extension ratio of the recommended heating time to the standard heating time.

FIG. 3B illustrates an example of the database stored in a cloud according to an exemplary embodiment of the present disclosure. More specifically, FIG. 3B illustrates an example of a database that stores the microwave oven internal log 370. Still more specifically, FIG. 3B illustrates an example of the microwave oven internal log corresponding to the microwave oven 200 among the microwave oven internal logs contained in the microwave oven internal log 370. Note that although not illustrated in FIG. 3B, the microwave oven internal log 370 also contains the microwave oven internal log corresponding to at least one second microwave oven.

The microwave oven internal log 370 includes a log indicating at what time and at which heat level (e.g., wattage and duration) the microwave oven 200 performed a heating operation. As illustrated in FIG. 3B, the microwave oven internal log 370 is formed as a set of, for example, the appliance ID, the heating start time, the cooking menu (e.g., microwave or oven), the power level (the wattage or the temperature), the usage time, the total usage time, and the total usage count. Every time the microwave oven 200 performs a heating operation, the microwave oven 200 stores, in the memory of the microwave oven 200, the microwave oven internal log 250 formed as a set of the appliance ID, the heating start time, the cooking menu (e.g., microwave or oven), the power level (the wattage or the temperature), the usage time, the total usage time, and the total usage count. Thereafter, the microwave oven 200 sends the stored microwave oven internal log 250 to the terminal device.

The log receiving unit 302 receives the microwave oven internal log 250 sent from, for example, the terminal device 100. The received microwave oven internal log is collected in the database of the microwave oven internal log 370.

In addition, every time the second microwave oven performs a heating operation, the second microwave oven stores, in the memory of the second microwave oven, a microwave oven internal log formed as the set of the appliance ID, the heating start time, the cooking menu (e.g., microwave or oven), the power level (the wattage or the temperature), the usage time, the total usage time, and the total usage count. Thereafter, the second microwave oven sends the stored microwave oven internal log to the second terminal device. For example, the log receiving unit 302 receives the microwave oven internal log sent from the second terminal device connected to one or more second microwave ovens. The received microwave oven internal log is collected into the database of the microwave oven internal log 370.

Note that the database that stores the food information 350, the database that stores the learned heating setting 360, and the database that stores the microwave oven internal log 370 are managed in one or more memories of the server apparatus 300.

The data structure of the microwave oven internal log of the one or more the second microwave ovens contained in the microwave oven internal log 370 is the same as that of the microwave oven 200 illustrated in FIG. 3B. Accordingly, description of the data structure is not repeated.

While the above-described example has been described with reference to the appliance ID as the information for identifying a microwave oven. However, the information for identifying a microwave oven is not limited thereto. For example, the information for identifying a microwave oven may further include other attribute information, such as the model number of the microwave oven or the information regarding the maker that manufactured the microwave oven. Alternatively, a predetermined test may be conducted on some parts of the microwave oven (e.g., the magnetron and the heater) before the microwave oven is shipped, and the resultant value of the conducted test (an initial value) may be included in the information for identifying the microwave oven as attribute information. An example of the predetermined test is a test for measuring the age-related deterioration of a part of the microwave oven.

The server apparatus 300 may be configured to be capable of extracting, from the microwave oven internal log 370, the microwave oven internal logs that include the same or a similar attribute information.

Technique for Obtaining Heating Setting

A technique for obtaining the heating setting for use in the terminal device 100 illustrated in FIG. 2 is described below. FIG. 4 is a flowchart of an example of a process for obtaining the heating setting performed by a terminal device according to an exemplary embodiment of the present disclosure.

The processing illustrated the flowchart of FIG. 4 starts when for example, the user operates the terminal device 100 and selects start of a food bar code recognition function.

As illustrated in FIG. 4, in step 101 (hereinafter, "step" is simply referred to as "ST"), the image capturing unit 103 captures the image of the bar code of a food.

In ST102, the recognition unit 104 performs image recognition on the data of the image of the bar code captured in ST101 (the captured image) and obtains the bar code number.

In ST103, the obtaining unit 105 uploads the microwave oven internal log 250 and the bar code number obtained in ST102 to request the heating setting from the server apparatus 300.

In ST104, the obtaining unit 105 receives, from the server apparatus 300, the heating setting in response to the request for the heating setting in ST103. The heating setting received from the server apparatus 300 includes the recommended heating setting (the learned heating setting) and the standard heating setting (the standard cooking setting). Note that a technique for determining the recommended heating setting in the server apparatus 300 is described below.

In ST105, the UI generation unit 106 generates the UI 102 for allowing the user to select one of the recommended heating setting and the standard heating setting received in ST104. The user selects one of the recommended heating setting and the standard heating setting using the UI 102.

If the recommended heating setting is selected (YES in ST105), the setting transmitting unit 107 sends the recommended heating setting to the microwave oven 200 in ST106. However, if the standard heating setting is selected (No in ST105), the setting transmitting unit 107 sends the standard heating setting to the microwave oven 200 in ST107. In this manner, the heating setting is set in the microwave oven 200.

Note that in FIG. 4, an example of the process for obtaining the heating setting performed by the terminal device 100 is illustrated. Since the process for obtaining the heating setting performed by the second terminal device connected to the second microwave oven is the same as the process illustrated in FIG. 4, detailed description of the process is not repeated.

Technique for Uploading Log

Figure 5:
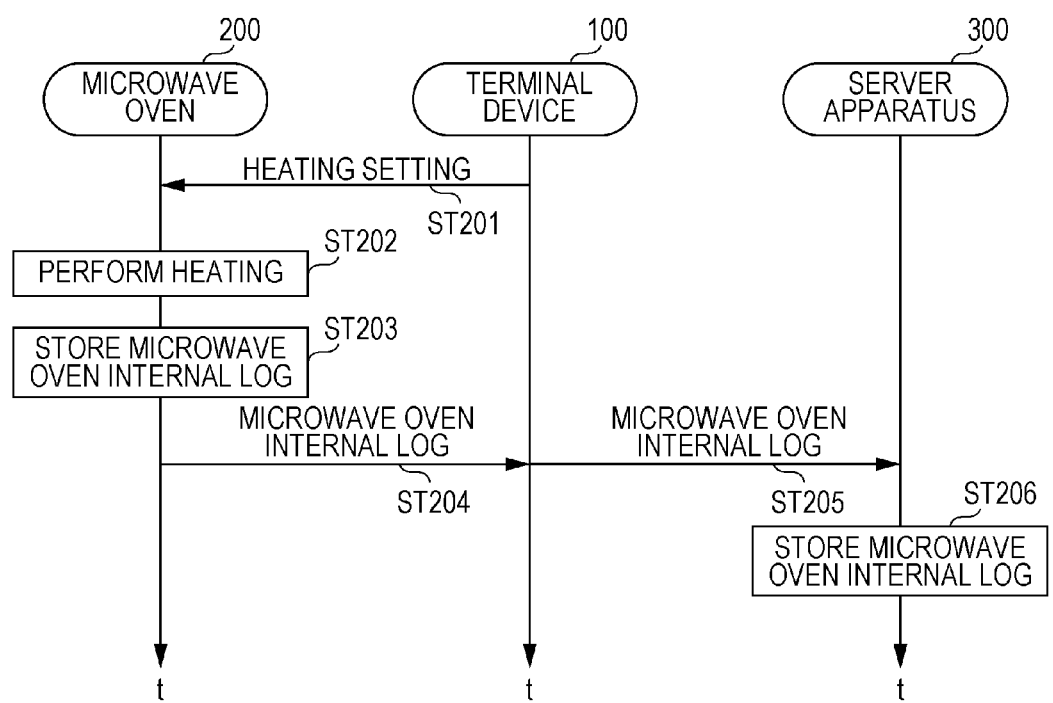
FIG. 5 is a sequence diagram of a microwave oven internal log upload process according to an exemplary embodiment of the present disclosure.

The process performed by the terminal device 100 illustrated in FIG. 2 before the terminal device 100 uploads the microwave oven internal log 250 to the server apparatus 300 is described below. FIG. 5 is a sequence diagram of a microwave oven internal log upload process according to an exemplary embodiment of the present disclosure. More specifically, FIG. 5 is a sequence diagram of a process performed by the terminal device 100 to upload, to the server apparatus 300, the microwave oven internal log 250 received from the microwave oven 200.

As illustrated in FIG. 5, in ST201, the terminal device 100 (the setting transmitting unit 107) sends a setting command to set the heating setting to the microwave oven 200 (the setting receiving unit 201). That is, the process performed in ST201 corresponds to the process performed in ST106 or ST107 illustrated in FIG. 4.

In ST202, the heating unit 202 of the microwave oven 200 performs a heating operation in accordance with the heating setting received in ST201.

In ST203, the recording unit 203 records, in the memory of the microwave oven 200, the information regarding the heating process performed in ST202 as the microwave oven internal log 250. The microwave oven internal log 250 is stored in, for example, the database managed in the memory of the microwave oven 200. The microwave oven internal log 250 contains, for example, the time at which the heating operation was performed, the function of the microwave oven 200 used when the heating operation was performed (e.g., microwave or oven), and the heating power level (a wattage or a temperature). The microwave oven internal log 250 further contains the total usage time during which the function of the microwave oven 200 for the heating operation is used and the total usage count of the function. For example, if the microwave function of the microwave oven 200 is used for the first time after the microwave oven 200 is purchased, the total usage count is set to "1", and the total usage time is set to the heating time that was set when the heating operation was performed. Thereafter, every time the microwave function of the microwave oven 200 is used, "1" is added to the total usage count and, in addition, the heating time that was set when the heating operation was performed is added to the heating time. To record the total usage count and the total usage time for another function (e.g., the oven function, the grill function, the toast function, or the steam function), the same process is performed.

In ST204, the log transmitting unit 204 sends, from among the pieces of information in the microwave oven internal log 250 recorded in the microwave oven 200 in ST203, at least the piece of information that has never been sent to the terminal device 100 to the terminal device 100 (the log transmitting and receiving unit 108).

Note that for example, upon receiving the microwave oven internal log 250 from the microwave oven 200 in ST204, the terminal device 100 may generate a UI for allowing the user to select whether an additional heating operation is performed or not. For example, if a sufficient amount of the microwave oven internal log for each of the microwave oven has not been collected in the database of the microwave oven internal log 370 of the server apparatus 300, only the standard heating time can be presented to the user.

In such a case, the terminal device 100 can present a UI for allowing the user to select whether an additional heating operation is performed or not. If the user selects the additional heating operation, the terminal device 100 can instruct the microwave oven 200 to perform the additional heating operation. To perform the additional heating operation, the terminal device 100 and the microwave oven 200 repeat the processes from ST201 to ST203 a number of times equal to the number of the additional heating operations. Hereinafter, the heating operation performed immediately before the first additional heating operation is referred to as a "first heating operation".

When an additional heating operation is performed, the microwave oven 200 updates the usage time and the total usage time in the microwave oven internal log 250, which were recorded in the microwave oven 200 in the first heating operation in ST203. More specifically, the microwave oven 200 updates the usage time for the first heating operation to the sum of the usage time recorded in the microwave oven internal log 250 in the first heating operation (a first heating time) and the heating time additionally set (a second heating time and the subsequent heating time). In addition, the microwave oven 200 updates the total usage time for the first heating operation to the total usage time recorded in the microwave oven internal log 250 in the first heating operation (the first heating time) and the heating time additionally set (a second heating time and the subsequent heating time).

Thereafter, if the user selects an option indicating that an additional heating operation is not performed through the UI displayed, the terminal device 100 can upload, to the server apparatus 300, the microwave oven internal log 250 received from the microwave oven 200 immediately before the selection.

In ST205, the log transmitting and receiving unit 108 of the terminal device 100 uploads, to the server apparatus 300 (the log receiving unit 302), the microwave oven internal log 250 received from the microwave oven 200 in ST204. Note that the microwave oven internal log 250 received from the microwave oven 200 is stored in the memory of the terminal device 100. The microwave oven internal log 250 stored in the memory of the terminal device 100 is used when the recommended heating setting is requested (ST103 illustrated in FIG. 4).

In ST206, the log receiving unit 302 of the server apparatus 300 receives the microwave oven internal log 250 from the terminal device 100 in ST205. Thereafter, the received microwave oven internal log 250 is appended to the microwave oven internal log 370 managed in the memory of the server apparatus 300 and is stored. In this manner, the server apparatus 300 stores the microwave oven internal log 370 formed from the microwave oven internal logs 250 sent from the microwave ovens 200. Note that the processes performed by the second terminal device connected to the second microwave oven before the second terminal device uploads the microwave oven internal log are similar to those illustrated in FIG. 5. Accordingly, description of the processes are not repeated.

Learning Process

Figures 6A, 6B:
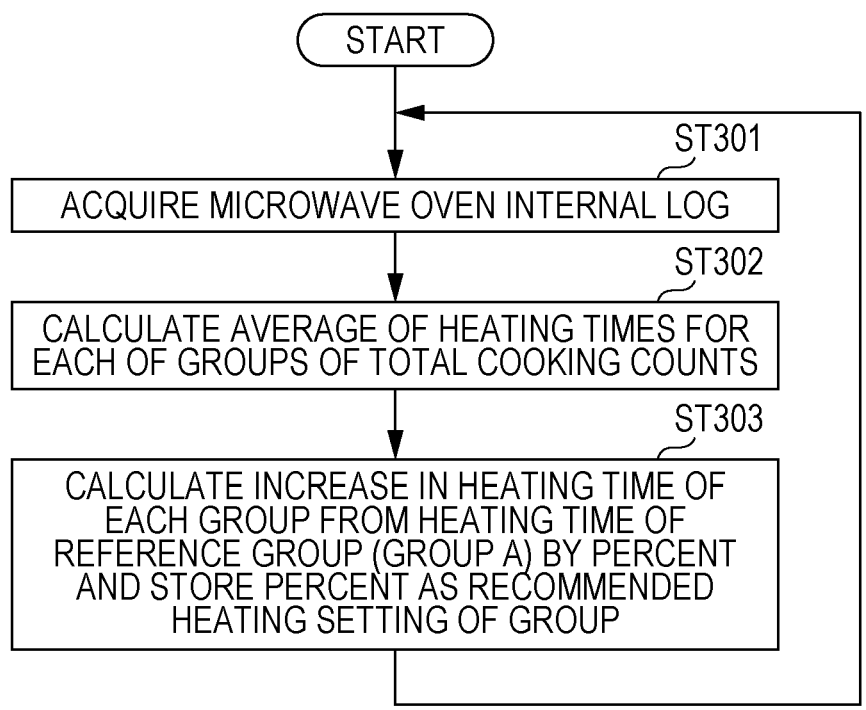
FIG. 6A is a flowchart of an example of a learning process performed by a server apparatus according to an exemplary embodiment of the present disclosure.
FIG. 6B illustrates an example of a table used by a server apparatus to divide the microwave oven internal logs of the microwave ovens into a plurality of groups according to an exemplary embodiment of the present disclosure.

The learning process performed by the learning unit 303 of the server apparatus 300 is described below. FIG. 6A is a flowchart of the learning process performed by a server apparatus according to an exemplary embodiment of the present disclosure. More specifically, FIG. 6A is a flowchart of an example of the learning process performed by the learning unit 303.

As illustrated in FIG. 6A, in ST301, the learning unit 303 acquires the microwave oven internal log 370 stored in the database. At that time, if each of the microwave oven internal logs of the microwave ovens included in the microwave oven internal log 370 contains the attribute information other than an appliance ID, the learning unit 303 may extract the microwave oven internal logs having the same or similar attribute information to acquire the microwave oven internal log 370.

In ST302, the learning unit 303 divides the total heating usage counts in the microwave oven internal log 370 acquired in ST301 into a plurality of groups and calculates the average of the heating times of each group.

Note that to calculate the average after selecting, from among the microwave ovens corresponding to the microwave oven internal logs used to calculate the average, the microwave ovens having the same or similar attribute information, the learning unit 303 can extract, from the microwave oven internal log 370, the microwave oven internal logs of the microwave ovens having the same or similar attribute information in ST301, In this manner, the reliability of the calculated average can be increased. Examples of the attribute information include the model number of the microwave oven and the information regarding the maker that manufactured the microwave oven. Alternatively, a predetermined test may be conducted on some parts of the microwave oven (e.g., the magnetron and the heater) before the microwave oven is shipped, and the resultant value of the conducted test (an initial value) may be included in the information for identifying the microwave oven as attribute information. An example of the predetermined test is a test for measuring the age-related deterioration of a part of the microwave oven.

FIG. 6B illustrates an example of a table used by a server apparatus to divide the microwave oven internal logs of the microwave ovens into a plurality of groups according to an exemplary embodiment of the present disclosure.

As illustrated in FIG. 6B, the ranges of the total heating usage count obtained when the microwave function of the microwave oven is used and a relationship among groups A to D each corresponding to one of the ranges are predefined. In FIG. 6B, the microwave oven internal log of the microwave oven having a total heating usage count of 1 to 5000 recorded in the microwave oven internal log 370 is defined as the microwave oven internal log of the group A. In addition, the microwave oven internal log of the microwave oven having a total heating usage count of 5001 to 10000 is defined as the microwave oven internal log of the group B. Furthermore, the microwave oven internal log of the microwave oven having a total heating usage count of 10001 to 15000 is defined as the microwave oven internal log of the group C. Still furthermore, the microwave oven internal log of the microwave oven having a total heating usage count of 15001 to 20000 is defined as the microwave oven internal log of the group D.

For example, the learning unit 303 assigns each of the microwave oven internal logs of the microwave ovens included in the microwave oven internal log 370 to one of the groups A to D using the table illustrated in FIG. 6B, Thereafter, the learning unit 303 calculates the average of the heating times contained in the microwave oven internal logs for each of the groups A to D.

In ST303, the learning unit 303 obtains the recommended heating setting (the extension ratio) of each of the groups.

It can be estimated that the level of the age-related deterioration of the microwave oven 200 decreases with decreasing total heating usage count and, thus, the heating time optimal for a given food decreases. Accordingly, the learning unit 303 uses the group A (i.e., the group having the lowest total heating usage count) as a reference and calculates the ratio of the average of the heating times of a group other than the group A to the average of the heating times of group A as the extension ratio of a heating time (i.e., a candidate of the recommended heating time).

More specifically, as illustrated in FIG. 6B, the learning unit 303 calculates the ratio (the percent) of the average of the heating times of the group B to the average of the heating times of the group A. Similarly, the learning unit 303 calculates the ratio (the percent) of the heating times of the group C to the average of the heating times of the group A. The same applies to the group D.

Thereafter, the learning unit 303 stores the learned heating setting 360 (the recommended heating setting) in the database managed in the memory of the server apparatus 300. Note that the learned heating setting is data represented by a pair consisting of one of the groups (the total usage count groups) and the extension ratio of a heating time. For example, in the case of the table illustrated in FIG. 6B, in the learned heating setting 360, the group A is associated with the "extension ratio of a heating time:100% (no increase)". In addition, the group B is associated with the "extension ratio of a heating time:110% (a 10% increase)". Furthermore, the group C is associated with the "extension ratio of a heating time:120% (a 20% increase)". Still furthermore, the group D is associated with the "extension ratio of a heating time:130% (a 30% increase)".

Note that the optimum heating time varies with each of types of food to be heated by the microwave oven 200. However, the learning unit 303 simply divides the logs into groups on the basis of the total heating usage counts in the microwave oven internal log 370 and calculates the average of the heating times of each group, regardless of the type of food to be heated. This is because it is assumed that the eating habit of the user who uses each of the microwave ovens 200 does not significantly change and, thus, the level of an increase or decrease in the heating time of the microwave oven 200 can be estimated from the overall trend of the heating time (the heating operation) of the microwave oven 200 regardless of the type of food to be cooked by the microwave oven 200.

Also note that while the learning unit 303 has divided the logs into groups based on total usage count range size of 5000, the range size is not limited thereto. The range size can be set to any appropriate count (i.e., the logs are divided into any number of groups). Alternatively, when the learning unit 303 divides the logs into groups, the total usage time may be used instead of the total usage count.

Note that instead of calculating the average of the heating times for each group, the learning unit 303 may employ another technique, such as a technique for calculating the intermediate value of the heating times.

In addition, the process in ST303 illustrated in FIG. 6 may be periodically performed at predetermined intervals, or may be performed each time the microwave oven internal log 370 is updated (each time the microwave oven internal log 250 is uploaded).

Determination of Recommended Heating Setting

Figure 7:
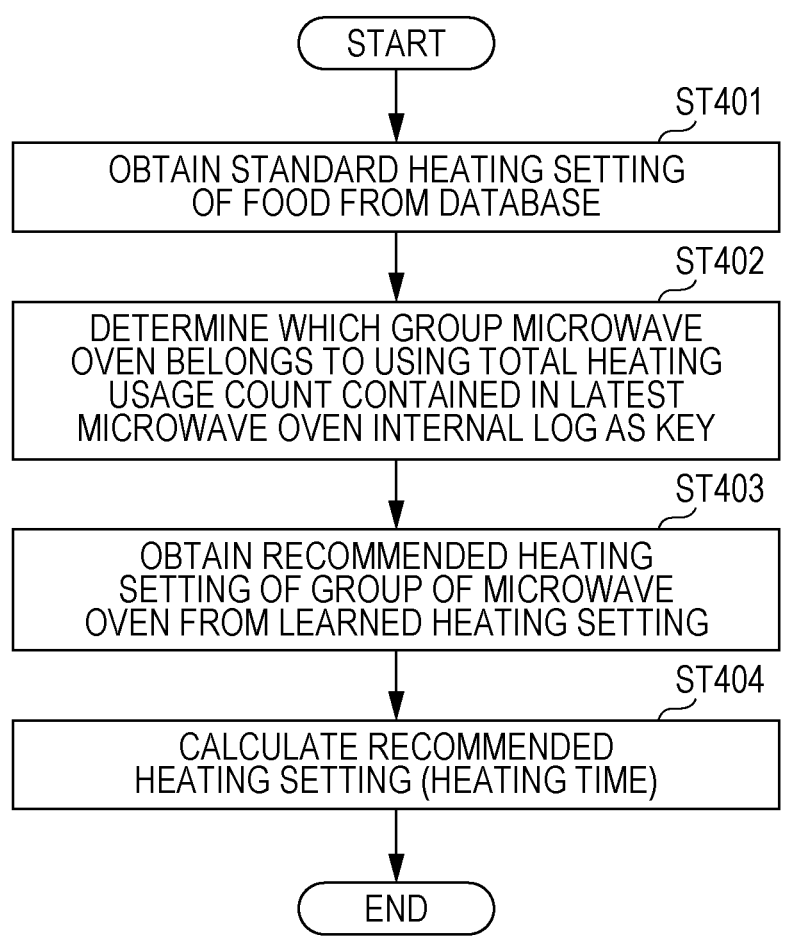
FIG. 7 is a flowchart illustrating an example of a process for determining the recommended heating setting performed by the server apparatus according to an exemplary embodiment of the present disclosure.

A method for determining the recommended heating setting performed by the server apparatus 300 is described in detail below. FIG. 7 is a flowchart illustrating an example of a process for determining the recommended heating setting performed by the server apparatus 300 according to an exemplary embodiment of the present disclosure. The processing illustrated in the flowchart of FIG. 7 starts when for example, the terminal device 100 requests the heating setting from the server apparatus 300.

In ST401, the search unit 301 uses the food information (the bar code number) sent from the terminal device 100 as a key and searches the database of the food information 350 (refer to FIG. 3A) for the heating time of a food corresponding to the bar code number serving as the key. In this manner, the search unit 301 acquires the heating time (the standard heating setting).

In ST402, the search unit 301 determines which one of the groups of the learned heating setting 360 the total heating usage count included in the microwave oven internal log 250 (the most recent log of the microwave oven 200) sent from the terminal device 100 belongs to.

In ST403, the search unit 301 uses the group determined in ST402 as a key and searches the database of the learned heating setting 360 so as to acquire the learned heating setting (e.g., the extension ratio applied to the standard heating time) corresponding to the group serving as the key.

In ST404, the search unit 301 calculates the recommended heating setting (the recommended heating time). For example, the search unit 301 multiplies the standard heating time acquired in ST401 by the extension ratio of the heating time acquired in ST403 to obtain the recommended heating setting. For example, if the standard heating time is 1 minute (60 seconds) and the extension ratio is 110%, the search unit 301 sets the recommended heating setting to 66 seconds.

Note that the process in ST404 may be performed by the terminal device 100 (e.g., the obtaining unit 105). More specifically, the search unit 301 can send the standard heating setting acquired in ST401 and the extension ratio of the heating time acquired in ST403 to the terminal device 100 without performing the process in ST404. Thereafter, as in the process in ST404, the terminal device 100 can multiply the standard heating time by the extension ratio of the heating time.

Display of UI

An example of the UI 102 displayed to allow the user to select one of the heating times is described below.

First Display Example

Figure 8A:
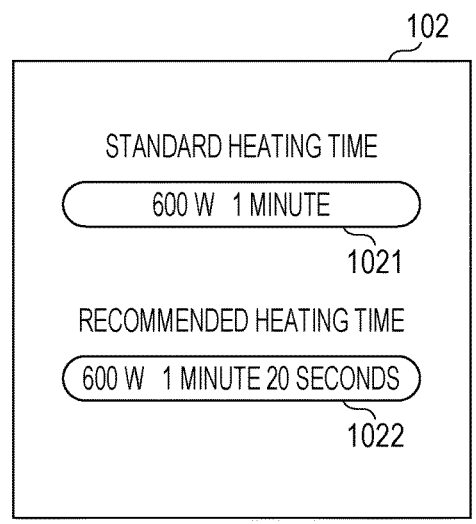
FIG. 8A illustrates an example of a UI according to an exemplary embodiment of the present disclosure.

FIG. 8A illustrates an example of a UI according to an exemplary embodiment of the present disclosure.

To display the screen illustrated in FIG. 8A, the terminal device 100, the microwave oven 200, and the server apparatus 300, for example, perform the following operations. That is, for example, the terminal device 100 (the obtaining unit 105) uploads the food information (the bar code number) about a food to be heated and the microwave oven internal log 250 (at least the total usage count) of the microwave oven 200. Thereafter, the terminal device 100 acquires, from the server apparatus 300, the standard heating time and the recommended heating time for the food to be heated.

The UI generation unit 106 generates the UI 102 that allows the user to select one of the standard heating time and the recommended heating time. Thereafter, the display input unit 101 displays the standard heating time and the recommended heating time on a display of the terminal device 100.

For example, as illustrated in FIG. 8A, the UI 102 has an option area 1021 that allows the user to select the standard heating time (1 minute in FIG. 8A) and an option area 1022 that allows the user to select the recommended heating time (1 minute 20 seconds in FIG. 8A). The option area 1021 and the option area 1022 are in the form of, for example, button icons. The user selects one of the option areas corresponding to the desired heating time in the UI 102 illustrated in FIG. 8A by touching the area (e.g., ST105 illustrated in FIG. 4).

Upon detecting that the option area 1021 is selected through the touch operation performed on the UI 102, the terminal device 100 (the setting transmitting unit 107) sends, to the microwave oven, a setting command to set the heating setting corresponding to the option area 1021 (in FIG. 8A, the heating power level is 600 W, and the heating time is 1 minute).

However, upon detecting that the option area 1022 is selected through the touch operation performed on the UI 102, the terminal device 100 (the setting transmitting unit 107) sends, to the microwave oven, a setting command to set the heating setting corresponding to the option area 1022 (in FIG. 8A, the heating power level is 600 W, and the heating time is 1 minute 20 seconds).

Thus, the microwave oven 200 executes the received setting command to set the heating setting corresponding to the option area 1021 or the option area 1022. Thereafter, the microwave oven 200 performs a heating operation on the basis of the heating setting selected by the user.

In this manner, since the user can select the recommended heating time for the food to be heated, the user can heat the food to an optimum temperature without performing an additional heating operation on the microwave oven 200.

Note that the terminal device 100 may acquire only the recommended heating time without acquiring the standard heating time and display only the recommended heating time in the UI 102.

Second Display Example

Figure 8B:
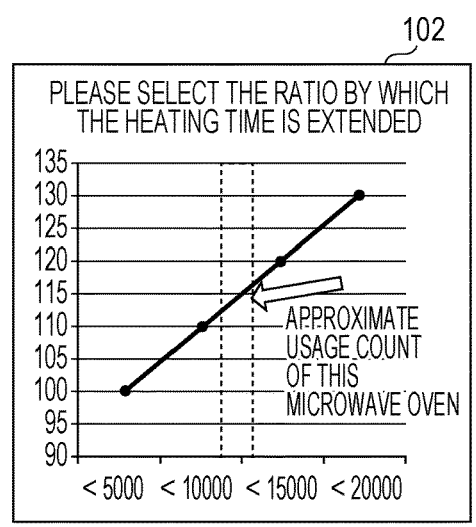
FIG. 8B illustrates an example of a UI according to an exemplary embodiment of the present disclosure.

FIG. 8B illustrates an example of a UI according to an exemplary embodiment of the present disclosure.

To display the screen illustrated in FIG. 8B, the terminal device 100, the microwave oven 200, and the server apparatus 300, for example, perform the following operations. That is, for example, the terminal device 100 (the obtaining unit 105) uploads at least the food information (the bar code number) about the food to be heated and the microwave oven internal log 250 (at least the total usage count) of the microwave oven 200. Thereafter, the terminal device 100 acquires, from the server apparatus 300, the standard heating time and the recommended heating time for the food to be heated and all the pieces of information in the learned heating setting 360. That is, the terminal device 100 acquires the candidates of the recommended heating time (the extension ratios) each corresponding to one of the groups of the total heating usage count in addition to the candidate of the recommended heating time (the extension ratio or the heating time) for the microwave oven 200.

As illustrated in FIG. 8B, the UI generation unit 106 generates the UI 102 displaying the relationship between the total heating usage count (i.e., the age-related deterioration level) and the extension ratio of the heating time. The relationship is indicated by the learned heating setting 360. In addition, the UI generation unit 106 highlights the range indicating the recommended heating time for the microwave oven 200 in the area of information regarding the relationship displayed in the UI 102. That is, the display input unit 101 displays, on the display of the terminal device 100, the relationship between the total heating usage count (e.g., each of the groups A to D illustrated in FIG. 6B) and the extension ratio and the range of the extension ratio corresponding to the total usage count of the microwave oven 200 in the area of information regarding the relationship displayed in the UI 102.

As illustrated in FIG. 8B, the UI 102 includes the total heating usage count and a graph having the abscissa representing a total heating usage count (i.e., the age-related deterioration level of the microwave oven) and the ordinate representing the extension ratio of a heating time defined as the ratio of the extended heating time to the standard heating time (the heating time of the group having the lowest total heating usage count). The UI 102 is displayed on the display of the terminal device 100.

In addition, in the UI 102, the relationship between a total heating usage count and the extension ratio of the heating time indicated by the learned heating setting 360 is plotted, and the neighboring plots are connected by a line. In addition, in the UI 102, an area indicating the extension ratio for the microwave oven 200 actually used by the user (the area surrounded by a dotted line) is displayed within the area displaying the relationship between the total usage count and the extension ratio on the display of the terminal device 100.

The user selects the area of the UI 102 illustrated in FIG. 8B and corresponding to the extension ratio of the desired heating time by, for example, touching the area.

For example, by referring to the UI 102 illustrated in FIG. 8B, the user can be aware that the average of the heating times of a microwave oven having a total usage count of 5001 to 10000 is higher than that of the microwave oven 200 having a total usage count of 1 to 5000 by about 10%. In addition, the user can be aware that since the total usage count of the microwave oven 200 used by the user is in the range from 5001 to 10000, the recommended heating time for the microwave oven is longer than the standard heating time by about 10%.

In this manner, the user can identify the recommended heating time for the microwave oven 200 that the user uses and recognize the recommended heating time for another microwave oven in accordance with the age-related deterioration of the microwave oven. For example, by viewing the UI 102 illustrated in FIG. 8B, the user can be aware that the level of the age-related deterioration (the total usage count) of the microwave oven 200 that the user uses is lower than that of another microwave oven in the group of a total usage count of 5001 to 10000 (i.e., the total usage count is higher than that of another microwave oven in the group). Accordingly, the user can select the heating time for a group other than the group of the recommended heating time (i.e., the group of a total usage count of 10001 to 15000).

For example, the user selects an area of the UI 102 (the graph illustrated in FIG. 8B) by touching the area. The terminal device 100 identifies the position of the area selected by the touch operation. For example, the terminal device 100 identifies a position in the abscissa of the selected area of the graph. Thus, the terminal device 100 can identify the group that the user has selected. Thereafter, the terminal device 100 identifies the extension ratio of the heating time corresponding to the identified group on the basis of the identified group and the relationship indicated by the graph. In this manner, the terminal device 100 can identify the extension ratio of the heating time corresponding to the area selected by the touch operation.

The terminal device 100 (the setting transmitting unit 107) calculates the heating time by multiplying the extension ratio of the heating time of the group corresponding to the selected area of the UI 102 by the standard heating time. Thereafter, the terminal device 100 (the setting transmitting unit 107) sends a setting command to set the heating setting including the calculated heating time to the microwave oven 200. The microwave oven 200 executes the setting command to set the heating setting and performs a heating operation on the basis of the heating setting.

While the present exemplary embodiment has been described with reference to the extension ratio of each of the groups obtained by dividing the total heating usage counts based on a range of the total heating usage counts, the present exemplary embodiment is not limited thereto. For example, in the UI 102 illustrated in FIG. 8B, the UI generation unit 106 may generate the relationship between the total usage count and the extension ratio between the neighboring plots by interpolation using the plots indicating the recommended heating times (the extension ratios) received from the server apparatus 300 (refer to a bold line). In this manner, in the UI 102 illustrated in FIG. 8B, the extension ratio of a heating time corresponding to the total usage count of the microwave oven 200 can be presented more precisely. For example, in the UI 102 illustrated in FIG. 8B, the user can be aware that the extension ratio of the heating time corresponding to the total usage count of the microwave oven 200 that the user uses (about 10000) (refer to the area surrounded by a dotted line) is about 115%. In this manner, the user can more accurately identify the recommended heating time corresponding to the age-related deterioration level of the microwave oven 200 that the user currently uses.

In addition, while the present exemplary embodiment has been described with reference to the UI 102 illustrated in FIG. 8B that displays the relationship between the extension ratio of the heating time and the age-related deterioration level (the total usage count), the present exemplary embodiment is not limited thereto. For example, the relationship between the recommended heating time and the age-related deterioration level (the total usage count) may be displayed on the display of the terminal device 100.

Third Display Example

FIG. 8O illustrates an example of the UI according to an exemplary embodiment of the present disclosure.

To display the screen illustrated in FIG. 80, the terminal device 100, the microwave oven 200, and the server apparatus 300, for example, perform the following operations. That is, the terminal device 100 (the obtaining unit 105) uploads the food information about the food to be heated (the bar code number) and the microwave oven internal log 250 (at least the total usage count) of the microwave oven 200. Thereafter, the terminal device 100 acquires, from the server apparatus 300, the standard heating time for the food to be heated and the extension ratio of the heating time corresponding to the microwave oven internal log 250 of the microwave oven 200.

The UI generation unit 106 generates a UI 102 that maps the total heating usage count in the microwave oven internal log 250 of the microwave oven 200 to the age of a human being and displays the age. In this manner, the UI generation unit 106 generates the UI 102 that treats the microwave oven 200 as a human being.

For example, the UI generation unit 106 has a correspondence between the total heating usage count and the age of a human being. The UI generation unit 106 identifies the age of a human being corresponding to the total heating usage count in the microwave oven internal log 250 on the basis of the correspondence.

In addition, the UI generation unit 106 multiplies the standard heating time received from the server apparatus 300 by the extension ratio of the heating time and obtains the recommended heating time. Thereafter, the UI generation unit 106 calculates the difference between the recommended heating time and the standard heating time as an extension time for extending the standard heating time. Note that the server apparatus 300 may calculate the extension time and send the calculated extension time to the terminal device 100.

Thereafter, as illustrated in FIG. 80, the UI generation unit 106 generates the UI 102 that displays the age of the microwave oven 200 as treated as a human being ("60 years old" in FIG. 8C) and the extension time for extending the standard heating time ("30 seconds" in FIG. 8C) so that the user can select the heating time. That is, the display input unit 101 displays, on the display, the extension time for extending the standard heating time calculated on the basis of the standard heating time and the extension ratio. At the same time, the display input unit 101 displays the age-related deterioration level of the microwave oven 200 in the form of the age of a human being corresponding to the total heating usage count in the microwave oven internal log 250.

Figure 8C:
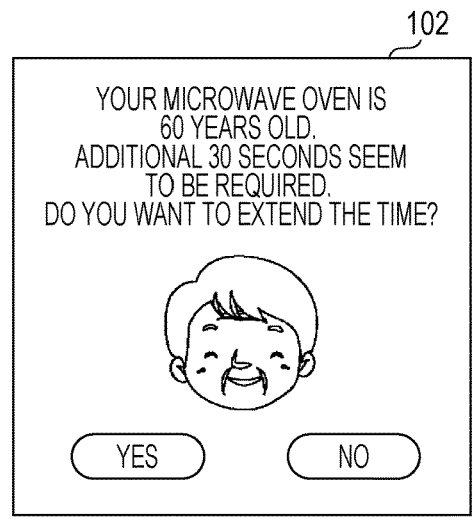
FIG. 8C illustrates an example of a UI according to an exemplary embodiment of the present disclosure.

The user selects whether the heating time is extended or not by touching the UI 102 illustrated in FIG. 8C. If the user selects extension of the heating time (if the user selects "YES"), the terminal device 100 sets the extended heating time (i.e., the recommended heating time). However, if the user does not select extension of the heating time (if the user selects "NO"), the terminal device 100 sets the heating time that is not extended (i.e., the standard heating time). Thereafter, the terminal device 100 (the setting transmitting unit 107) sends the heating setting including the calculated heating time to the microwave oven 200. The microwave oven 200 performs a heating operation on the basis of the heating setting selected by the user.

In this manner, the user can visually see the age-related deterioration level of the microwave oven 200 and select the heating time corresponding to the age-related deterioration level.

In addition, if the difference between the recommended heating time and the standard heating time is greater than a predetermined time, the UI generation unit 106 may generate a UI 102 including a message prompting the user to renew the microwave oven 200. Alternatively, if the total heating usage count in the microwave oven internal log 250 of the microwave oven 200 is greater than a predetermined count, the UI generation unit 106 may generate a UI 102 including a message prompting the user to renew the microwave oven 200.

Still alternatively, after selection as to whether or not the heating time is extended is made through a touch operation performed on the UI 102 illustrated in FIG. 80, the information including a message prompting the user to renew the microwave oven 200 may be displayed on the display.

Note that when a configuration in which the server apparatus 300 calculates the extension time is employed and if the calculated extension time is longer than a predetermined time, the server apparatus 300 may send a message prompting the user to renew the microwave oven 200 to the terminal device 100.

The message prompting the user to renew the microwave oven 200 may include data containing the product name and the photo of a new microwave oven to be purchased. In addition, the message prompting the user to renew the microwave oven 200 may include the uniform resource locator (URL) of advertising information regarding a new microwave oven to be purchased or an advertising server (not illustrated) that provides the advertising information via the Internet.

Note that the method for visualizing the age-related deterioration level of the microwave oven 200 in accordance with the total heating usage count is not limited to treating the microwave oven 200 as a human being. For example, the microwave oven 200 may be treated as an animal. Alternatively, the illustration of the microwave oven may be used.

As described above, various display examples of the UI 102 can be used.

While the examples illustrated in FIGS. 8A to 8C have been described with reference to detection of user's selection through a touch operation performed on the UI 102 displayed on a touch panel display, the present exemplary embodiment is not limited thereto. For example, the terminal device 100 may include a voice collecting unit, such as a microphone, (not illustrated) and a speech recognition unit (not illustrated) that recognizes speech input to the voice collecting unit. Thus, the terminal device 100 may select, from among the candidates of the cooking time including a recommended cooking time displayed on the display, one of the cooking times that corresponds to the speech recognized by the speech recognition unit. In this manner, a cooking time can be selected by using speech.

While the examples illustrated in FIGS. 8A to 8C have been described with reference to the UI 102 displayed on the touch panel display, the present exemplary embodiment is not limited thereto. For example, the terminal device 100 may include a speech output unit, such as a speaker, (not illustrated), and the speech output unit may output the information regarding the candidates of the cooking time including the recommended cooking time.

As described above, according to the present exemplary embodiment, the terminal device 100 acquires, from a server apparatus, the information indicating the recommended heating time corresponding to the age-related deterioration level of the microwave oven 200 from among the candidates of the recommended heating time obtained on the basis of the information indicating the age-related deterioration levels of the microwave ovens 200 recorded in the microwave oven internal logs 370 of a plurality of the microwave ovens and the heating times, Thereafter, the terminal device 100 displays, on the display thereof, the UI 102 for allowing the user to select one of the candidates of the heating time including the recommended heating time for the microwave oven 200.

By displaying, on the display of the terminal device 100, the recommended heating time obtained through a learning operation performed on the basis of the actual heating times of a plurality of the microwave ovens in this manner, the information providing system can provide the setting of the heating time (the cooking time) optimum for the age-related deterioration of the microwave oven to the user before the user uses the microwave oven 200. That is, according to the present exemplary embodiment, the cooking program in accordance with the age-related deterioration of a cooking appliance can be provided.

Modifications of Exemplary Embodiment

In the above-described exemplary embodiment, the heating time in accordance with the age-related deterioration of the microwave oven 200 is provided to the user on the basis of only the total heating usage counts of the microwave ovens. In contrast, according to the present modification, the heating time is provided to the user in accordance with the total usage count of each of menus of the microwave oven 200 (e.g., microwave (heating), oven, grill, and steam).

Note that in the following description, the microwave oven 200 has a microwave function and an oven function, as an example.

In such a case, the terminal device 100 uploads, to the server apparatus 300, the microwave oven internal log 250 including the total usage count (or the total usage time) of heating and the total usage count (or the total usage time) of the oven.

Learning Process

In the above-described exemplary embodiment, for example, the total heating usage counts are divided into groups, and the average of the heating times for each group is calculated in ST302 illustrated in FIG. 6A.

Figures 9A, 9B:
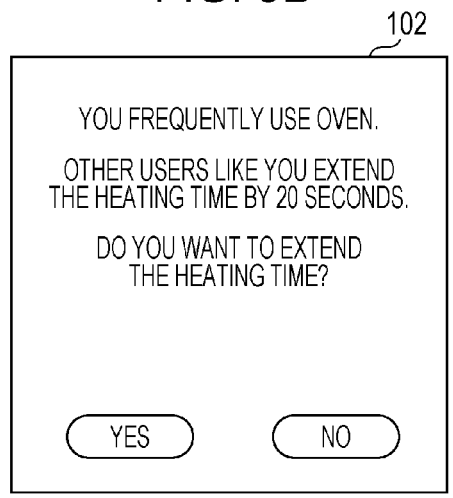
FIG. 9A illustrates an example of a table used when the microwave oven internal logs of the microwave ovens are divided into groups according to a modification of the exemplary embodiment of the present disclosure.
FIG. 9B illustrates an example of a UI according to a modification of the exemplary embodiment of the present disclosure.

In contrast, according to the present modification, the learning unit 303 of the server apparatus 300 divides the microwave oven internal logs, each corresponding to one of the microwave ovens, in the microwave oven internal log 370 into groups for each of pairs consisting of the total heating usage count and the total usage count. FIG. 9A illustrates an example of a table used when the microwave oven internal logs of the microwave ovens are divided into groups according to the modification of the exemplary embodiment of the present disclosure. In FIG. 9A, a relationship between a pair consisting of the range of the total heating usage count measured when the microwave function of the microwave oven is used and the range of the total usage count measured when the oven function of the microwave oven is used and each of groups A to L is predefined. For example, as illustrated in FIG. 9A, the learning unit 303 divides the microwave oven internal logs, each corresponding to one of the microwave ovens, in the microwave oven internal log 370 into the groups A to L. Thus, the microwave oven internal logs, each corresponding to one of the microwave ovens, in the microwave oven internal log 370 are divided into the groups A to L each corresponding to a pair consisting of a total usage count of heating and a total usage count of an oven. That is, the microwave oven internal logs having substantially the same usage trend of the microwave function and having substantially the same usage trend of the oven function are classified into the same group.

Subsequently, the learning unit 303 calculates the average of the heating times of each of the groups.

Subsequently, the learning unit 303 obtains the recommended heating time (the extension ratio) of each group (corresponding to ST303 illustrated in FIG. 6A).

For example, the learning unit 303 calculates the ratio (the percentage) of the average of the heating times of each of the groups B to L to the average of the heating times of the group A (the total usage count: 1 to 5000, and the total usage count: 1 to 1000). Thereafter, the learning unit 303 stores, in the database, data indicating a pair consisting of each group and the extension ratio of the heating time as the learned heating setting (the recommended heating setting) 360.

As described above, the microwave oven internal logs, each corresponding to one of the microwave ovens, in the microwave oven internal log 370 are divided into groups based on a pair consisting of the total usage count of the microwave function and the total usage count of the oven function. The learning unit 303 defines, as the recommended heating time of the microwave function, the ratio of the average of the heating times of each of the groups to the average of the cooking times (the heating times) of the microwave function of the group corresponding to the pair having the lowest total usage count of the microwave function and the lowest total usage count of the oven function.

Determination of Recommended Heating Setting

According to the present modification, among the processes performed in ST401 to ST404 illustrated in FIG. 7, the process performed in ST402 differs from that in FIG. 7.

Unlike the process performed in ST402, the search unit 301 of the server apparatus 300 identifies which group in FIG. 9A (e.g., one of the groups A to L illustrated in FIG. 9A) the total usage count of heating and the total usage count of the oven contained in the microwave oven internal log 250 sent from the terminal device 100 belongs to.

Thereafter, the search unit 301 acquires the learned heating setting (e.g., the extension ratio applied to the standard heating time) corresponding to the identified group. For example, if the microwave oven internal log 250 of the microwave oven 200 contains a total usage count of heating in the range from 5001 to 10000 and a total usage count of the oven in the range from 1 to 1000, the search unit 301 acquires the learned heating setting corresponding to the group D illustrated in FIG. 9A.

UI Display Example

FIG. 9B illustrates an example of a UI according to the present modification.

To display the screen illustrated in FIG. 9B, the terminal device 100, the microwave oven 200, and the server apparatus 300, for example, perform the following operations. That is, the terminal device 100 (the obtaining unit 105) uploads the food information about a food to be heated (the bar code number) and the microwave oven internal log 250 (at least the total usage count of heating and the total usage count of the oven) of the microwave oven 200. Thereafter, the terminal device 100 acquires, from the server apparatus 300, the standard heating time of the food to be heated (i.e., the food to be cooked using the microwave function) and the extension ratio of the heating time (i.e., the cooking setting for the microwave function) corresponding to the microwave oven internal log 250 of the microwave oven 200.

The UI generation unit 106 identifies the user's usage trend of the microwave oven 200 on the basis of the total usage count of heating and the total usage count of the oven contained in the microwave oven internal log 250 of the microwave oven 200. For example, if the total usage count of heating and the total usage count of the oven contained in the microwave oven internal log 250 of the microwave oven 200 match those of the group C illustrated in FIG. 9A, the UI generation unit 106 identifies the usage trend which suggests that the oven function of the microwave oven 200 is more frequently used than the microwave function of the microwave oven 200. In contrast, if, for example, the total usage count of heating and the total usage count of the oven contained in the microwave oven internal log 250 of the microwave oven 200 match those of the group D, G, or J illustrated in FIG. 9A, the UI generation unit 106 identifies the usage trend which suggests that the microwave function of the microwave oven 200 is more frequently used than the oven function of the microwave oven 200. The UI generation unit 106 generates the UI 102 that displays the identified usage trend of the microwave oven 200. For example, the UI 102 illustrated in FIG. 9B displays the message "You frequently use oven." that indicates the user frequently uses the oven function.

In addition, the UI generation unit 106 generates the UI 102 that displays the extension time (20 seconds in FIG. 9B) corresponding to the recommended heating setting (the extension ratio of the heating time) received from the server apparatus 300 and an option area that allows the user to select the heating time ("YES" and "NO" in FIG. 9B).

That is, the display input unit 101 displays the extension time applied to the standard cooking time calculated on the basis of the standard heating time of the food to be heated and the extension ratio. The display input unit 101 further displays the usage trend of the microwave function of the microwave oven 200 and the usage trend of the oven function corresponding to the microwave oven internal log 250 of the microwave oven 200.

The user selects whether the heating time is extended by, for example, touching the UI 102 illustrated in FIG. 9B. If the user selects extension of the heating time (if the user selects "YES"), the terminal device 100 sets the extended heating time (i.e., the recommended heating time). However, if the user does not select extension of the heating time (if the user selects "NO"), the terminal device 100 sets the heating time that is not extended (i.e., the standard heating time). Thereafter, the terminal device 100 (the setting transmitting unit 107) sends the calculated heating time to the microwave oven 200. The microwave oven 200 performs a heating operation on the basis of the heating setting selected by the user.

The degradation level of the performance of the microwave oven 200 may vary in accordance with the usage trend of each of the menus. That is, the usage trend of some menu (e.g., the oven function) may have a negative impact on the performance of another menu (e.g., the microwave function). According to the present exemplary embodiment, the terminal device 100 receives, from the server apparatus 300, the recommended heating time determined in accordance with the combination of the usage counts of a plurality of cooking functions (the microwave function and the oven function). In this manner, the user can set the heating setting in accordance with the age-related deterioration of the whole body of the microwave oven 200 more accurately than setting the heating setting learned on the basis of only the total heating usage count.

As described above, the exemplary embodiment of the present disclosure is provided.

Note that in the above-described embodiment, the recommended heating time may be calculated by associating the microwave oven internal log 370 with the attribute of the user. As used herein, the term "attribute of the user" refers to data formed from a set of, for example, the user ID, the age group, the gender, the occupation, the family structure, and the resident area. In addition, in such a case, the microwave oven internal log 250 further includes the user ID of a user who used the microwave oven 200. The same applies to the microwave oven internal log of the second microwave oven. In this case, the microwave oven internal log corresponding to each of the microwave ovens contained in the microwave oven internal log 370 includes a user ID. More specifically, the server apparatus 300 (the learning unit 303) divides the microwave oven internal logs, each corresponding to one of the microwave ovens, in the microwave oven internal log 370 into groups based on a given item of the user attribute (e.g., the age group). Thereafter, the server apparatus 300 calculates the recommended heating time corresponding to the age-related deterioration level of the microwave oven (e.g., the total usage count) for each group in the same manner as described above. That is, in the learned heating setting 360, the user attribute and the total usage count are associated with the recommended heating time (e.g., the extension ratio). In addition, the terminal device 100 uploads the user ID of the user who operates the microwave oven 200 in addition to the food information of the food to be heated (the bar code number) and the total usage count of the microwave oven 200. In this manner, the terminal device 100 can acquire the recommended heating time of the food to be heated for the age group corresponding to the user. Thus, the recommended heating time obtained by taking into account the heating times for other users who are in the same age group as the user can be provided to the user. Note that the user attribute used in calculation of the recommended heating time is not limited to the age group. Another user attribute can be employed.

In addition, in the above-described exemplary embodiment, if the microwave oven 200 can be connected to the Internet, the microwave oven 200 is directly connected to the server apparatus 300. In such a case, for example, the microwave oven 200 can have the configuration of the terminal device 100 illustrated in FIG. 2 and present the recommended heating setting to the user through the UI 102.

In addition, in the above-described exemplary embodiment, the recommended setting of the microwave function (the heating operation) of the microwave oven 200 is provided to the user. However, according to the above-described exemplary embodiment, the function for which the recommended setting is provided is not limited to the microwave function. For example, the recommend setting may be provided to another function, such as the oven function, the grill function, or a steam function.

While the exemplary embodiment of the present disclosure has been described with reference to the accompanying drawings, the above-described functions of the devices of the terminal device 100 or the server apparatus 300 can be achieved by computer programs.

FIG. 10 illustrates an example of the hardware configuration of a computer according to an exemplary embodiment of the present disclosure. More specifically, FIG. 10 illustrates the hardware configuration of a computer that achieves the functions of the devices. A computer 1100 includes an input device 1101, such as a keyboard, a mouse, or a touch pad, an output device 1102, such as a display or a speaker, a central processing unit (CPU) 1103, a read only memory (ROM) 1104, a random access memory (RAM) 1105, a storage device 1106, such as a hard disk drive or a solid state drive (SSD), a reading device 1107 that reads information on a recording medium, such as a digital versatile disk read only memory (DVD-ROM) or a universal serial bus (USB) memory, and a network card 1108 that performs communication via a network. These devices are connected with one another via a bus 1109.

The reading device 1107 reads a program from a recording medium that stores the program to achieve each of the functions of the above-described devices and stores the program in the storage device 1106. Alternatively, the network card 1108 communicates with a server connected to the network and causes the storage device 1106 to store a program that achieves the function of each of the above-described devices and that is downloaded from the server.

Thereafter, the CPU 1103 copies the program stored in the storage device 1106 to the RAM 1105 and sequentially reads, from the RAM 1105, the instructions contained in the program. In this manner, the function of each of the above-described devices can be achieved.

In addition, the technology described in the above-described exemplary embodiment is achieved in cloud services of, for example, the following types.

Service Type 1: Company-Owned Data Center Type

Figure 11:
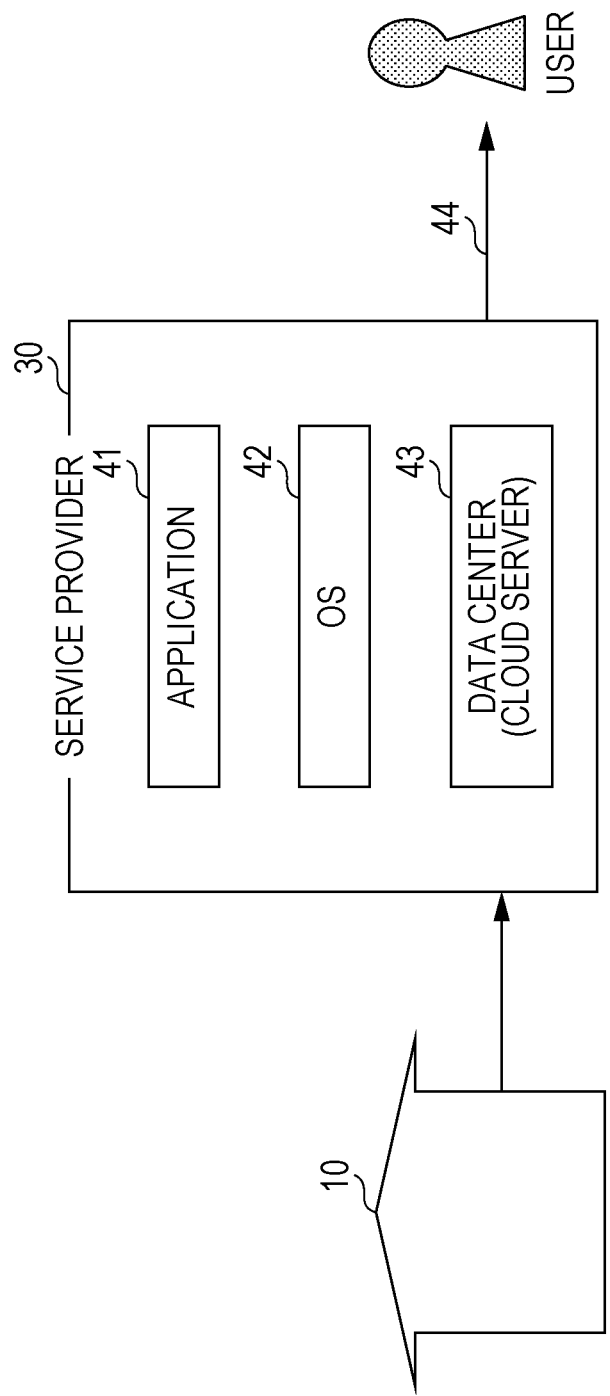
FIG. 11 illustrates an example of a cloud service of a type 1 according to an exemplary embodiment of the present disclosure.

FIG. 11 illustrates an example of a cloud service of a type 1 (a company-owned data center type) according to an exemplary embodiment of the present disclosure. In the cloud service of this type, the service provider 30 acquires information from a group 10 and provides a service to users. In the cloud service of this type, the service provider 30 has the function of the data center operating company. That is, the service provider owns the cloud server 21 that manages big data. Accordingly, there is no data center operating company.

In the cloud service of this type, the service provider 30 operates and manages a data center 43 (the cloud server 21). In addition, the service provider 30 manages the OS 42 and an application 41. The service provider 30 provides a service 44 using the OS 42 and the application 41 managed by the service provider 30.

Service Type 2: IaaS Use Type

Figure 12:
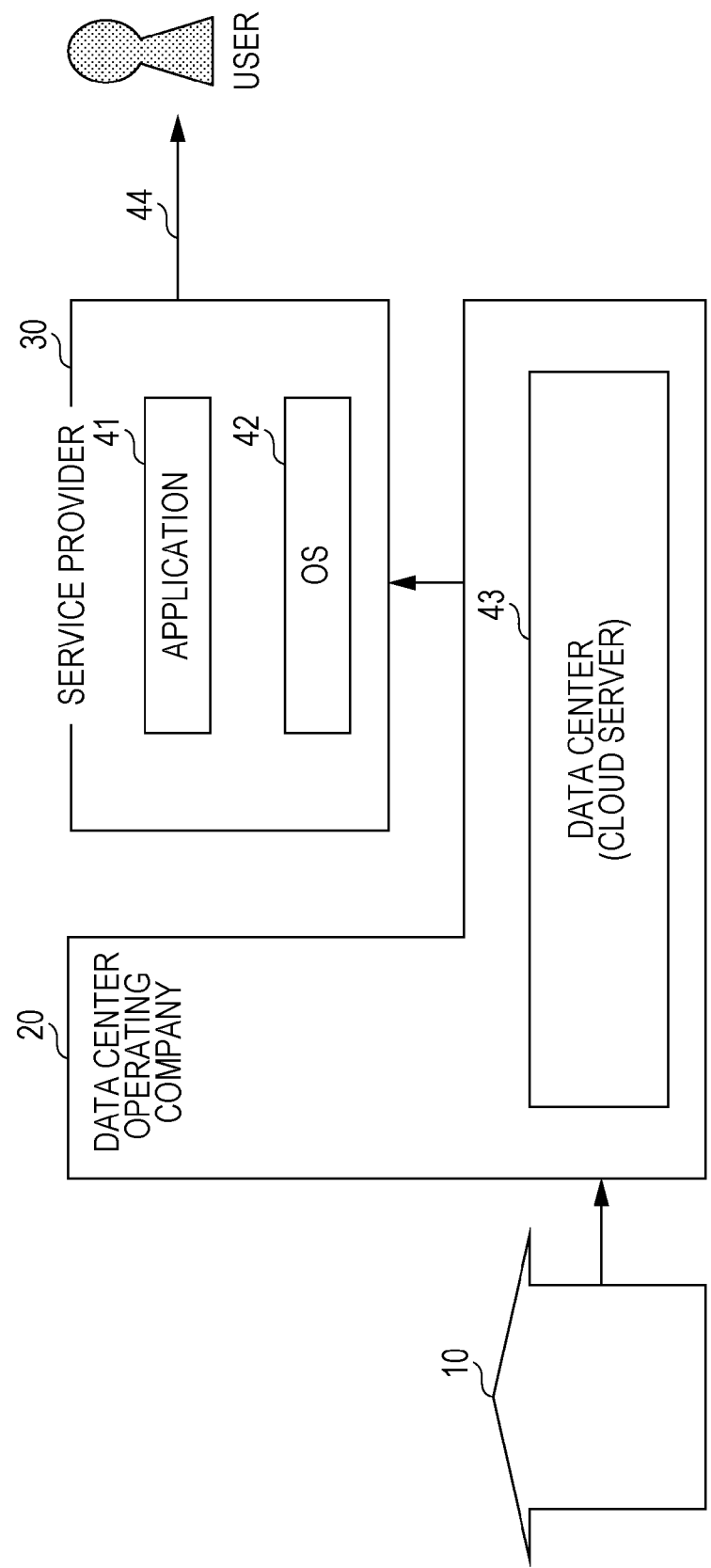
FIG. 12 illustrates an example of a cloud service of a type 2 according to an exemplary embodiment of the present disclosure.

FIG. 12 illustrates an example of a cloud service of a type 2 (an IaaS use type) according to an exemplary embodiment of the present disclosure. "IaaS" stands for an "infrastructure as a service". IaaS is a cloud service providing model that provides, as a service, the infrastructure itself for constructing and operating a computer system via the Internet.

In the cloud service of this type, the data center operating company 20 operates and manages a data center 43 (the cloud server 21). In addition, the service provider 30 manages the OS 42 and the application 41. The service provider 30 provides a service 44 using the OS 42 and the application 41 managed by the service provider 30.

Service Type 3: PaaS Use Type

Figure 13:
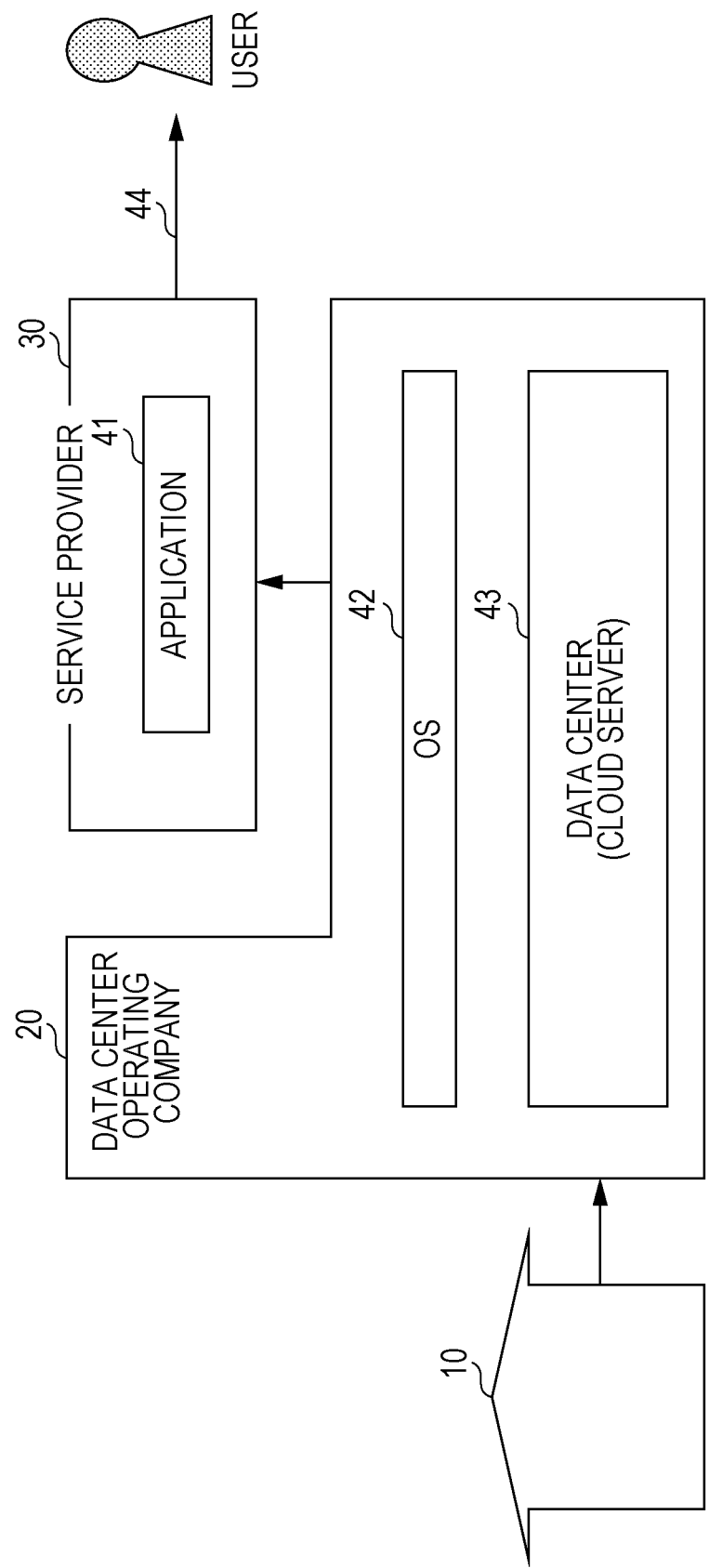
FIG. 13 illustrates an example of a cloud service of a type 3 according to an exemplary embodiment of the present disclosure.

FIG. 13 illustrates an example of a cloud service of a type 3 (a PaaS use type) according to an exemplary embodiment of the present disclosure. "PaaS" stands for a "platform as a service". PaaS is a cloud service providing model that provides, as a service, the platform serving as the base on which software is developed and executed via the Internet.

In the cloud service of this type, the data center operating company 20 manages the OS 42 and operates and manages the data center 43 (the cloud server 21). In addition, the service provider 30 manages the application 41. The service provider 30 provides a service 44 using the OS 42 managed by the data center operating company 20 and the application 41 managed by the service provider 30.

Service Type 4: SaaS Use Type

Figure 14:
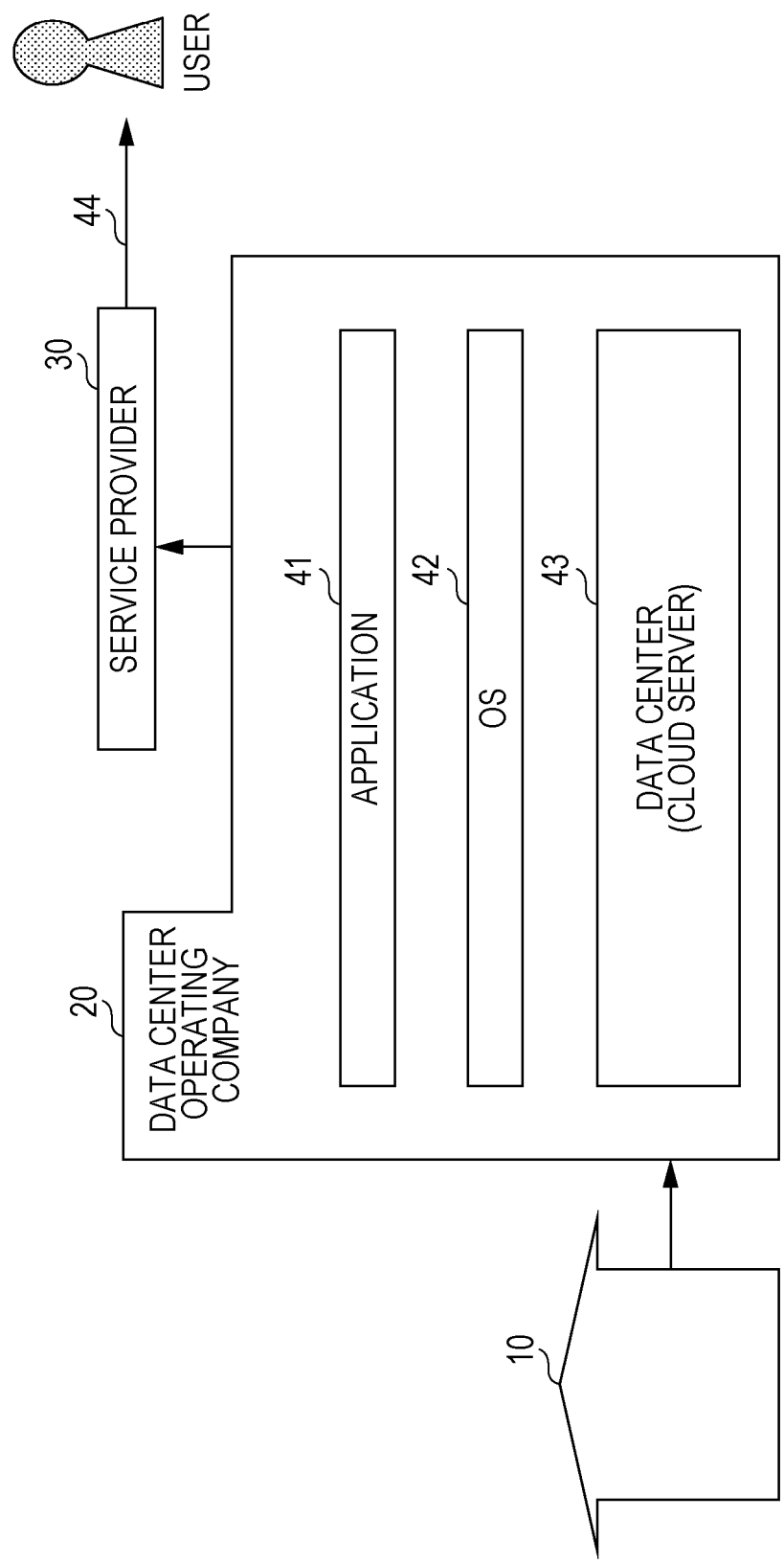
FIG. 14 illustrates an example of a cloud service of a type 4 according to an exemplary embodiment of the present disclosure.

FIG. 14 illustrates an example of a cloud service of a type 4 (an SaaS use type) according to an exemplary embodiment of the present disclosure. "SaaS" stands for a "software as a service". SaaS is a cloud service providing model that allows a company or an individual person (a user) that does not own a data center (a cloud server) to use, for example, an application provided by a platform provider that owns a data center (a cloud server) via a network, such as the Internet.

In the cloud service of this type, the data center operating company 20 manages the application 41 and the OS 42 and operates and manages the data center 43 (the cloud server 21). In addition, the service provider 30 provides a service 44 using the OS 42 and the application 41 managed by the data center operating company 20.

In any one of the above-described types, the service provider 30 provides a service. In addition, for example, the service provider or the data center operating company may develop the OS, the application, or the database of big data by itself or ask a third party to develop the OS, the application, or the database of big data.

According to the present disclosure, an excellent information providing method for use in a control method, a recording medium, a terminal device, and the information providing system for controlling a cooking appliance can be provided.

What is claimed is:

1. A control method for controlling a terminal device connected to a first cooking appliance among a plurality of cooking appliances and to a server apparatus including a memory that manages cooking appliance logs each including at least a cooking time of a food and first information indicating an age-related deterioration level of one of the cooking appliances, the control method comprising:

acquiring, using a processor of the terminal device, third information indicating a recommended cooking time corresponding to second information indicating an age-related deterioration level of the first cooking appliance, wherein in the acquiring, the third information is acquired from among candidates of recommended cooking time that are calculated on the basis of the first information and cooking times and that are stored in the server apparatus;

generating, using the processor, a user interface that allows a user to select any one of the candidates of a cooking time including at least the recommended cooking time for the first cooking appliance using the third information;

displaying, using the processor, the generated user interface on a display of the terminal device; and upon detecting, using the processor, selection of one of the cooking times corresponding to an operation input from an input interface, outputting, using the processor, a setting command for setting the selected cooking time to the first cooking appliance.

2. The control method according to claim 1, wherein, the acquiring further acquires, from the server apparatus, a standard cooking time of a food to be cooked by the first cooking appliance;

wherein, the generating generates, as the user interface a user interface including an icon corresponding to the standard cooking time and an icon corresponding to the recommended cooking time; and wherein, when selection of one of the icon corresponding to the standard cooking time and the icon corresponding to the recommended cooking time is detected as the selection of one of the cooking times, the outputting outputs, to the first cooking appliance, as the setting command, a setting command for setting a cooking time corresponding to the selected icon.

3. The control method according to claim 1,
wherein, the acquiring further acquires, from the server apparatus, the candidates of the recommended cooking time each corresponding to one of the age-related deterioration levels of the cooking appliances,
wherein the generating generates, as the user interface, a user interface including a relationship between the age-related deterioration level and the candidate of the recommended cooking time and an area of the recommended cooking time for the first cooking appliance in the displayed relationship, and
wherein, when selection of the area of the recommended cooking time for the first cooking appliance is detected as the selection of one of the cooking times, the outputting outputs, to the first cooking appliance, as the setting command, a setting command for setting a cooking time corresponding to the recommended cooking time.

4. The control method according to claim 1,
wherein, the display is a touch panel display,
wherein, the input interface is the touch panel display,
wherein, the acquiring further acquires, from the server apparatus, the candidates of the recommended cooking time each corresponding to one of the age-related deterioration levels of the cooking appliances,
wherein, the generating generates, as the user interface, a user interface including a relationship between the age-related deterioration level and the candidate of the recommended cooking time and an area of the recommended cooking time for the first cooking appliance in the displayed relationship, and
wherein, the control method further comprises,
upon detecting, using the processor, a touch operation performed on the touch panel display displaying the relationship through an operation input to the generated user interface, identifying, using the processor, the recommended cooking time on the basis of a touched position in the touch panel display, and
wherein, the outputting outputs to the first cooking appliance, as the setting command, a setting command for setting a cooking time corresponding to the identified cooking time.

5. The control method according to claim 1, wherein the third information indicates an extension ratio of the recommended cooking time to a standard cooking time for a food,
wherein, the acquiring further acquires, from the server apparatus, the standard cooking time of a food to be cooked by the first cooking appliance, and
wherein, the generated user interface further includes an extension time that is applied to the standard cooking time and that is calculated on the basis of the standard cooking time, the extension ratio and the age-related deterioration level of the first cooking appliance visualized in accordance with the second information.

6. The control method according to claim 1, wherein the first information includes a total usage count of a first cooking function and a total usage count of a second cooking function of each of the cooking appliances, the second information includes a total usage count of the first cooking function and a total usage count of the second cooking function of the first cooking appliance, and the third information indicates an extension ratio of the recommended cooking time to the standard cooking time of a food for the first cooking function of the first cooking appliance, and wherein, the acquiring further acquires, from the server apparatus, the standard cooking time of a food to be cooked by the first cooking appliance using the first cooking function; and
wherein, the generated user interface further includes an extension time that is applied to the standard cooking time and that is calculated on the basis of the standard cooking time and the extension ratio, a usage trend of the first cooking function of the first cooking appliance corresponding to the second information, and a usage trend of the second cooking function of the first cooking appliance corresponding to the second information.

7. The control method according to claim 1, wherein the first information indicates a total usage count of a cooking function of each of the cooking appliances,
wherein the second information indicates a total usage count of a cooking function of the first cooking appliance, and
wherein a plurality of groups are formed by dividing the cooking appliance logs into groups based on a predetermined range of the total usage count, and the candidate of the recommended cooking time is a ratio of an average of the cooking times of each of the groups to an average of the cooking times of a group having the lowest total usage count.

8. The control method according to claim 1, wherein the first information indicates a first total usage count of a first cooking function and a second total usage count of a second cooking function of each of the cooking appliances,
wherein the second information indicates a total usage count of the first cooking function and a total usage count of the second cooking function of the first cooking appliance, and
wherein a plurality of groups are formed by dividing the cooking appliance logs of the cooking appliances based on a pair consisting of the first total usage count and the second total usage count, and the candidate of the recommended cooking time of the first cooking function is a ratio of the average of the cooking times of the first cooking function of each of the groups to the average of the cooking times of the first cooking function of the groups corresponding to the pair having the lowest first total usage count and the lowest second total usage count.

9. A non-transitory computer-readable recording medium storing a program for controlling a computer connected to a first cooking appliance among a plurality of cooking appliances and to a server apparatus that manages cooking appliance logs each including at least a cooking time of a food and first information indicating an age-related deterioration level of one of the cooking appliances, the program causes the computer to perform steps comprising:
acquiring, from among candidates of a recommended cooking time that are calculated on the basis of the first information and cooking times and that are stored in a server apparatus, third information indicating a recommended cooking time corresponding to second information indicating an age-related deterioration level of the first cooking appliance;
generating a user interface that allows a user to select any one of the candidates of a cooking time including at least the recommended cooking time for the first cooking appliance using the third information;
displaying the generated user interface on a display included in the computer, and
upon detecting selection of one of the cooking times corresponding to an operation input from an input interface, outputting, to the first cooking appliance, a setting command for setting the selected cooking time.

10. A terminal device connected to a first cooking appliance among a plurality of cooking appliances and to a server apparatus that manages cooking appliance logs each including at least a cooking time of a food and first information indicating an age-related deterioration level of one of the cooking appliances, the terminal device comprising:

an input interface that receives an operation input;
a display; and
a processor which, in operation:
acquires, from among candidates of a recommended cooking time that are calculated on the basis of the first information and cooking times and that are stored in a server apparatus, third information indicating a recommended cooking time corresponding to second information indicating an age-related deterioration level of the first cooking appliance;
generates a user interface for allowing a user to select any one of the candidates of a cooking time including at least the recommended cooking time for the first cooking appliance using the third information; and
displays the generated user interface on the display;
upon detecting selection of one of the cooking times as the operation input from the input interface, outputs a setting command for setting the selected cooking time to the first cooking appliance.

11. The terminal device according to claim 10, wherein the terminal device is connected to the first cooking appliance via a network.

12. An information providing method for a server apparatus connected, via a network, to a plurality of terminal devices each communicably connected to one of a plurality of cooking appliances, the method comprising:

receiving, using a processor of the server apparatus, a cooking appliance log including a cooking time of a food cooked by the cooking appliance controlled by the terminal device and first information indicating an age-related deterioration level of the cooking appliance controlled by the terminal device via the network, wherein the cooking appliance log is received from each of the terminal devices in the receiving;

calculating, using the processor, candidates of a recommended cooking time each corresponding to one of the age-related deterioration levels on the basis of the first information and cooking time using a first memory that collects and manages the received cooking appliance logs;

storing, using the processor, third information in a second memory, wherein the third information indicates the candidates of the recommended cooking time each corresponding to one of the age-related deterioration levels;

searching, using the processor, the second memory for the third information corresponding to second information received from a first terminal among the plurality of terminal devices and indicating the age-related deterioration level of a first cooking appliance connected to the first terminal device; and sending, using the processor, the third information to the first terminal device to cause the first terminal device connected to the first cooking appliance to generate a user interface that allows a user to select any one of the candidates of a cooking time including at least the recommended cooking time for the first cooking appliance using the third information and to display the generated user interface on a display of the terminal device.

* * * * *